United States Patent [19]

Iwata et al.

[11] Patent Number: 5,956,167
[45] Date of Patent: Sep. 21, 1999

[54] LIGHT BRANCHING AND INSERTION APPARATUS AND OPTICAL TRANSMISSION SYSTEM HAVING LIGHT BRANCHING AND INSERTION APPARATUS

[75] Inventors: Hiroyuki Iwata, Yokohama; Haruo Fujiwara, Kawasaki, both of Japan

[73] Assignee: Fujitsu Limited, Kawasaki, Japan

[21] Appl. No.: 08/800,748

[22] Filed: Feb. 14, 1997

[30]       Foreign Application Priority Data

Jul. 9, 1996   [JP]   Japan ..................................... 8-179613

[51] Int. Cl.⁶ ...................................................... H04J 14/02
[52] U.S. Cl. ........................................... 359/130; 359/127
[58] Field of Search .................................. 359/127–131, 359/124, 125

[56]             References Cited

U.S. PATENT DOCUMENTS

| | | | |
|---|---|---|---|
| 5,572,357 | 11/1996 | Nakazato et al. ....................... | 359/341 |
| 5,586,115 | 12/1996 | Nakano et al. .......................... | 370/376 |
| 5,615,290 | 3/1997 | Harasawa et al. ...................... | 359/127 |
| 5,726,785 | 3/1998 | Chawki et al. ......................... | 359/130 |
| 5,751,456 | 5/1998 | Koonen ................................... | 359/127 |
| 5,778,118 | 7/1998 | Sridhar .................................... | 359/130 |

FOREIGN PATENT DOCUMENTS 56-8103   1/1981   Japan .

*Primary Examiner*—Leslie Pascal
*Attorney, Agent, or Firm*—Staas & Halsey

[57]                 ABSTRACT

The invention provides a light branching and insertion apparatus wherein branching and insertion of signal light can be effected accurately with a low loss and with a high degree of accuracy by optical transmission lines of a simple construction. The apparatus includes a first branching element for outputting signal light of a first wavelength from within signal light inputted from a first optical fiber to a third optical fiber and outputting signal light of the other wavelengths to a fourth optical fiber, a first insertion element for outputting signal light inputted from a fifth optical fiber to a second optical fiber, a second branching element for outputting signal light of a second wavelength from within signal light inputted from a sixth optical fiber to an eighth optical fiber and outputting signal light of the other wavelengths to a ninth optical fiber, a second insertion element for outputting signal light inputted from a tenth optical fiber to a seventh optical fiber, a third branching element for outputting signal light of a third wavelength from within signal light inputted from an eleventh optical fiber to the fifth optical fiber and outputting signal light of the other wavelengths to the tenth optical fiber, and a third insertion element for outputting signal light inputted from the ninth optical fiber to a twelfth optical fiber.

15 Claims, 16 Drawing Sheets

LIGHT BRANCHING AND INSERTION APPARATUS AND OPTICAL TRANSMISSION SYSTEM HAVING LIGHT BRANCHING AND INSERTION APPARATUS

BACKGROUND OF THE INVENTION

1. Field of the Invention

This invention relates to a light branching and insertion apparatus suitable for use, in an optical transmission system wherein optical communication is performed between a plurality of terminal stations, to branch optical transmission lines each formed from an optical fiber to interconnect the terminal stations, and also to an optical transmission system having a light branching and insertion apparatus of the type mentioned.

2. Description of the Related Art

In order to allow communication of signal light between terminal stations spaced from each other, for example, with a sea interposed therebetween, an optical transmission system has been developed wherein an optical fiber cable is laid on the bottom of the sea and signal light is repeated and amplified in a plurality of stages using a plurality of optical amplifiers provided for the optical fiber cable.

An example of such an optical transmission system laid on the bottom of a sea as just described will be described with reference to FIG. 15.

Referring to FIG. 15, the optical transmission system generally denoted at 100 is constructed to effect bidirectional communication between a plurality of terminal stations, and includes, as such plurality of terminal stations, for example, an A station 101, a B station 102, a C station 103 and a D station 104. The A to D stations 101 to 104 are connected to each other by optical transmission lines 107 each formed from an optical fiber via light branching and insertion apparatus 105 and 106.

In particular, as seen from FIG. 15, the A station 101 and the C station 103 are connected to each other with the light branching and insertion apparatus 105 interposed therebetween, and the B station 102 and the D station 104 are connected to each other with the light branching and insertion apparatus 106 interposed therebetween. The A station 101 and the B station 102, the A station 101 and the D station 104, the B station 102 and the C station 103, and the C station 103 and the D station 104, are connected to each other with the light branching and insertion apparatus 105 and 106 interposed therebetween.

The optical transmission lines 107 which connect the A station 101, B station 102 and C station 103 to each other in the light branching and insertion apparatus 105 shown in FIG. 15 are specifically shown in FIG. 16.

Referring to FIG. 16, the light branching and insertion apparatus 105 shown is interposed at branching points of the optical transmission lines 107 which connect the A station 101, B station 102 and C station 103 to each other, and the A station 101 and the B station 102, the A station 101 and the C station 103, and the C station 103 and the B station 102, are connected to each other with the light branching and insertion apparatus 105 interposed therebetween.

Referring back to FIG. 15, a plurality of optical amplifiers 108 for amplifying signal light to be transmitted in a plurality of stages are provided for each of the optical transmission lines 107.

In the optical transmission system 100 shown in FIG. 15 having the construction described above, signal light is communicated among the A to D stations 101 to 104.

However, since, in the light branching and insertion apparatus 105 shown in FIGS. 15 and 16 or the light branching and insertion apparatus 106 shown in FIG. 15, the optical transmission lines 107 overlap with each other between the different terminal stations, an optical transmission system which employs such a light branching and insertion apparatus as just described has a subject to be solved in that, if the number of terminal stations provided in the optical transmission system increases, the optical transmission lines and the light branching instruction apparatus are complicated in construction.

On the other hand, in recent years, research and development for an optical transmission line formed from an optical fiber for wavelength multiplexing (WDM) which effects optical wavelength multiplexing transmission and for an optical amplifier for WDM have been and are being proceeded. In an optical transmission system which employs such an optical transmission line or optical amplifier for WDM as just mentioned, signal light of a plurality of wavelengths can be transmitted by means of a single optical transmission line, and the signal light of the plurality of wavelengths transmitted in this manner can be amplified by a single optical amplifier.

Therefore, a demand for, as a light branching and insertion apparatus to be applied to an optical transmission system for WDM, a light branching and insertion apparatus which can effect, when signal light of a plurality of wavelengths is transmitted without using overlapping optical transmission lines, branching (wave demultiplexing) or insertion (wave multiplexing) of the signal light depending upon the wavelength is increasing.

One of such light branching and insertion apparatus is a fiber grating filter wherein gratings are formed on two buses of a Mach-Zehnder interferometer. In the fiber grating filter, the gratings are formed so as to reflect signal light of a desired wavelength in order to allow branching and insertion of signal light of the wavelength.

However, since a fiber grating filter having the construction described above is formed from an optical fiber, characteristics thereof are sometimes varied by a temperature variation. Further, since a branching element and an insertion element for signal light are formed from optical couplers, there is another subject to be solved in that the loss in branching and insertion of signal light is high.

Further, such a fiber grating filter as described above is applied to an optical transmission system which effects one-directional communication, and there is a further subject to be solved in that the fiber grating filter cannot be applied as it is to another optical transmission system which effects bidirectional communication.

SUMMARY OF THE INVENTION

It is an object of the present invention to provide a light branching and insertion apparatus and an optical transmission system including such a light branching and insertion apparatus wherein branching and/or insertion of signal light upon transmission of signal light can be effected with a low loss and with a high degree of accuracy by a simple construction without provision of overlapping optical transmission lines.

In order to attain the object described above, according to an aspect of the present invention, there is provided a light branching and insertion apparatus, comprising a first branching element for outputting signal light of a first wavelength from within signal light inputted thereto from an ascending input side optical fiber to an ascending output side optical fiber and outputting signal light of the other wavelengths than the first wavelength from within the signal light inputted thereto from the ascending input side optical fiber to a branching output side optical fiber, a first insertion element for outputting signal light inputted thereto from a branching input side optical fiber to the ascending output side optical fiber, a second branching element for outputting signal light of a second wavelength from within signal light inputted thereto from a descending input side optical fiber to a descending output side optical fiber and outputting signal light of the other wavelengths than the second wavelength from within the signal light inputted thereto from the descending input side optical fiber to the branching output side optical fiber, a second insertion element for outputting signal light inputted thereto from a branching input side optical fiber to a descending output side optical fiber, a third branching element for outputting signal light of a third wavelength from within signal light inputted thereto from the branching input side optical fiber to the branching input side optical fiber and outputting signal light of the other wavelengths than the third wavelength from within the signal light inputted thereto from the branching input side optical fiber to the branching input side optical fiber, and a third insertion element for outputting signal light inputted thereto from the descending input side optical fiber to the branching output side optical fiber.

The light branching and insertion apparatus may be constructed such that the signal light of the first wavelength from within the signal light inputted from the ascending input side optical fiber is outputted to the ascending output side optical fiber via the first branching element and the first insertion element and the signal light of the other wavelengths than the first wavelength from within the signal light inputted from the ascending input side optical fiber is outputted to the branching output side optical fiber via the first branching element and the third insertion element, that the signal light of the third wavelength from within the signal light inputted from the branching input side optical fiber is outputted to the ascending output side optical fiber via the third branching element and the first insertion element, that the signal light of the second wavelength from within the signal light inputted from the descending input side optical fiber is outputted to the descending output side optical fiber via the second branching element and the second insertion element and the signal light of the other wavelengths than the second wavelength from within the signal light inputted from the descending input side optical fiber is outputted to the branching output side optical fiber via the second branching element and the third insertion element, and that the signal light of the other wavelengths than the third wavelength from within the signal light inputted from the branching input side optical fiber is outputted to the descending output side optical fiber via the third branching element and the second insertion element.

The light branching and insertion apparatus is advantageous in that branching and insertion of signal light upon transmission of signal light can be effected with a low loss and with a high degree of accuracy while simplifying the construction of optical transmission lines each formed from an optical fiber.

Or, the light branching and insertion apparatus may be constructed such that the first branching element is formed from a dielectric multilayer film filter which functions, for the signal light of the first wavelength from within the signal light inputted from the ascending input side optical fiber, as a band-pass filter which outputs the signal light of the first wavelength to the ascending output side optical fiber, but functions, for the signal light of the other wavelengths than the first wavelength from within the signal light inputted from the ascending input side optical fiber, as a band block filter which outputs the signal light of the other wavelengths to the branching output side optical fiber, that the first insertion element is formed from another dielectric multilayer film filter which functions as an optical coupler which outputs the signal light inputted from the branching input side optical fiber to the ascending output side optical fiber, that the second branching element is formed from a further dielectric multilayer film filter which functions, for the signal light of the second wavelength from within the signal light inputted from the descending input side optical fiber, a band-pass filter which outputs the signal light of the second wavelength to the descending output side optical fiber, but functions, for the signal light of the other wavelengths than the second wavelength from within the signal light inputted from the descending input side optical fiber, as a band block filter which outputs the signal light of the other wavelengths to the branching output side optical fiber, that the second insertion element is formed from a still further dielectric multilayer film filter which functions as an optical coupler which outputs the signal light inputted from the branching input side optical fiber to the descending output side optical fiber, that the third branching element is formed from a yet further dielectric multilayer film filter which functions, for the signal light of the third wavelength from within the signal light inputted from the branching input side optical fiber, as a band-pass filter which outputs the signal light of the third wavelength to the branching input side optical fiber, but functions, for the signal light of the other wavelengths than the third wavelength from within the signal light inputted from the branching input side optical fiber, as a band block filter which outputs the signal light of the other wavelengths to the branching input side optical fiber, and that the third insertion element is formed from a yet further dielectric multilayer film filter which functions as an optical coupler which outputs the signal light inputted from the descending input side optical fiber to the branching output side optical fiber.

With the light branching and insertion apparatus, since each of the first branching element, first insertion element, second branching element, second insertion element, third branching element and third insertion element is formed from a dielectric multilayer film filter, branching and insertion of signal light can be effected with a low loss without application of any voltage. Consequently, the light branching and insertion apparatus is advantageous in that it operates stably also in an optical transmission system which effects submarine optical communication.

Alternatively, the light branching and insertion apparatus may be constructed such that the first branching element is formed from a dielectric multilayer film filter which functions, for the signal light of the first wavelength from within the signal light inputted from the ascending input side optical fiber, as a band-pass filter which outputs the signal light of the first wavelength to the ascending output side optical fiber, but functions, for the signal light of the other wavelengths than the first wavelength from within the signal light inputted from the ascending input side optical fiber, as a band block filter which outputs the signal light of the other wavelengths to the branching output side optical fiber, that the first insertion element is formed from an optical wave combiner which functions as an optical coupler which outputs the signal light inputted from the branching input side optical fiber to the ascending output side optical fiber, that the second branching element is formed from another dielectric multilayer film filter which functions, for the signal light of the second wavelength from within the signal light inputted from the descending input side optical fiber, a band-pass filter which outputs the signal light of the second wavelength to the descending output side optical fiber, but functions, for the signal light of the other wavelengths than the second wavelength from within the signal light inputted from the descending input side optical fiber, as a band block filter which outputs the signal light of the other wavelengths to the branching output side optical fiber, that the second insertion element is formed from another optical wave combiner which functions as an optical coupler which outputs the signal light inputted from the branching input side optical fiber to the descending output side optical fiber, that the third branching element is formed from a further dielectric multilayer film filter which functions, for the signal light of the third wavelength from within the signal light inputted from the branching input side optical fiber, as a band-pass filter which outputs the signal light of the third wavelength to the ascending output side optical fiber, but functions, for the signal light of the other wavelengths than the third wavelength from within the signal light inputted from the branching input side optical fiber, as a band block filter which outputs the signal light of the other wavelengths to the descending output side optical fiber, and that the third insertion element is formed from a further optical wave combiner which functions as an optical coupler which outputs the signal light inputted from the descending input side optical fiber to the branching output side optical fiber, the first insertion element being provided in a stage following the first branching element while the second insertion element is provided in a stage following the second branching element.

With the light branching and insertion apparatus, since each of the first, second and third branching elements is formed from a dielectric multilayer film filter while the first, second and third insertion elements is formed from an optical wave combiner, branching and insertion of signal light can be effected with a low loss without application of any voltage. Consequently, the light branching and insertion apparatus is advantageous in that it operates stably also in an optical transmission system which effects submarine optical communication.

The light branching and insertion apparatus may be constructed such that each of the first branching element and the first insertion element is formed from a grating filter and/or each of the second branching element and the second insertion element is formed from a grating filter.

Here, the light branching and insertion apparatus may be constructed such that the grating filter is a fiber grating filter or a waveguide type grating filter.

The light branching and insertion apparatus in this instance is advantageous in that it is simple in construction.

According to another aspect of the present invention, there is provided a light branching and insertion apparatus, comprising a branching element for outputting signal light of a first wavelength from within signal light inputted thereto from an input side optical fiber to an output side optical fiber and outputting signal light of the other wavelengths than the first wavelength from within the signal light inputted thereto from the input side optical fiber to a branching output side optical fiber, and an insertion element for outputting signal light inputted thereto from a branching input side optical fiber to an output side optical fiber, the branching element being formed from a dielectric multilayer film filter which functions, for the signal light of the first wavelength from within the signal light inputted thereto from the input side optical fiber, as a band-pass filter which outputs the signal light of the first wavelength to the output side optical fiber, but functions, for the signal light of the other wavelengths than the first wavelength from within the signal light inputted thereto from the input side optical fiber, as a band block filter which outputs the signal light of the other wavelengths to the branching output side optical fiber, the insertion element being formed from another dielectric multilayer film filter of the same type as that of the branching element which functions as an optical coupler which outputs the signal light inputted thereto from the branching input side optical fiber to the output side optical fiber.

With the light branching and insertion apparatus, since each of the branching element and the insertion element is formed from a dielectric multilayer film filter, there is an advantage that branching and insertion of signal light upon transmission of signal light can be effected with a low loss and with a high degree of accuracy while simplifying the construction of optical transmission lines each formed from an optical fiber.

According to a further aspect of the present invention, there is provided a light branching and insertion apparatus, comprising a branching element for outputting signal light of a first wavelength from within signal light inputted thereto from an input side optical fiber to an output side optical fiber and outputting signal light of the other wavelengths than the first wavelength from within the signal light inputted thereto from the input side optical fiber to a branching output side optical fiber, and an insertion element for outputting signal light inputted thereto from a branching input side optical fiber to an output side optical fiber, the branching element being formed from a dielectric multilayer film filter which functions, for the signal light of the first wavelength from within the signal light inputted thereto from the input side optical fiber, as a band-pass filter which outputs the signal light of the first wavelength to the output side optical fiber, but functions, for the signal light of the other wavelengths than the first wavelength from within the signal light inputted thereto from the input side optical fiber, as a band block filter which outputs the signal light of the other wavelengths to the branching output side optical fiber, the insertion element being formed from an optical wave combiner which functions as an optical coupler which outputs the signal light inputted thereto from the branching input side optical fiber to the output side optical fiber, the insertion element being provided in a stage following the branching element.

With the light branching and insertion apparatus, since the branching element is formed from a dielectric multilayer film filter and the insertion element is formed from an optical wave combiner, there is an advantage that branching and insertion of signal light upon transmission of signal light can be effected with a low loss and with a high degree of accuracy while simplifying the construction of optical transmission lines each formed from an optical fiber.

According to a still further aspect of the present invention, there is provided an optical transmission system with a light branching and insertion apparatus, comprising a plurality of terminal stations, a plurality of optical transmission lines each formed from an optical fiber for connecting the terminal stations to each other, and a light branching and insertion apparatus provided at branching points of the optical transmission lines for allowing communication of signal light to be performed between the terminal stations via the optical transmission lines, the light branching and insertion apparatus including a first branching element for outputting signal light of a first wavelength from within signal light inputted thereto from an ascending input side optical fiber, which forms one of the optical transmission lines, to an ascending output side optical fiber, which forms one of the optical transmission lines, and outputting signal light of the other wavelengths than the first wavelength from within the signal light inputted thereto from the ascending input side optical fiber to a branching output side optical fiber, a first insertion element for outputting signal light inputted thereto from a branching input side optical fiber, which forms one of the optical transmission lines, to the ascending output side optical fiber, a second branching element for outputting signal light of a second wavelength from within signal light inputted thereto from a descending input side optical fiber, which forms one of the optical transmission lines, to a descending output side optical fiber, which forms one of the optical transmission lines, and outputting signal light of the other wavelengths than the second wavelength from within the signal light inputted thereto from the descending input side optical fiber to a branching output side optical fiber, a second insertion element for outputting signal light inputted thereto from the branching input side optical fiber to a descending output side optical fiber, a third branching element for outputting signal light of a third wavelength from within signal light inputted thereto from the branching input side optical fiber to the ascending output side optical fiber and outputting signal light of the other wavelengths than the third wavelength from within the signal light inputted thereto from the branching input side optical fiber to the descending output side optical fiber, and a third insertion element for outputting signal light inputted thereto from the descending input side optical fiber to the branching output side optical fiber.

With the optical transmission system with the light branching and insertion apparatus, there is an advantage that branching and insertion of signal light upon transmission of signal light can be effected with a low loss and with a high degree of accuracy while simplifying the construction of optical transmission lines each formed from an optical fiber.

According to a yet further aspect of the present invention, there is provided an optical transmission system with a light branching and insertion apparatus, comprising a plurality of terminal stations, a plurality of optical transmission lines each formed from an optical fiber for connecting the terminal stations to each other, and a light branching and insertion apparatus provided at branching points of the optical transmission lines for allowing communication of signal light to be performed between the terminal stations via the optical transmission lines, the light branching and insertion apparatus including a branching element for outputting signal light of a first wavelength from within signal light inputted thereto from an input side optical fiber, which forms one of the optical transmission lines, to an output side optical fiber, which forms one of the optical transmission lines, and outputting signal light of the other wavelengths than the first wavelength from within the signal light inputted thereto from the input side optical fiber to a branching output side optical fiber, which forms one of the optical transmission lines, and an insertion element for outputting signal light inputted thereto from a branching input side optical fiber to, which forms one of the optical transmission lines, the output side optical fiber, the branching element being formed from a dielectric multilayer film filter which functions, for the signal light of the first wavelength from within the signal light inputted thereto from the input side optical fiber, as a band-pass filter which outputs the signal light of the first wavelength to the output side optical fiber, but functions, for the signal light of the other wavelengths than the first wavelength from within the signal light inputted thereto from the input side optical fiber, as a band block filter which outputs the signal light of the other wavelengths to the branching output side optical fiber, the insertion element being formed from another dielectric multilayer film filter of the same type as that of the branching element which functions as an optical coupler which outputs the signal light inputted thereto from the branching input side optical fiber to the output side optical fiber.

With the optical transmission system with a light branching and insertion apparatus, there is an advantage that branching and insertion of signal light upon transmission of signal light can be effected with a low loss and with a high degree of accuracy while simplifying the construction of optical transmission lines each formed from an optical fiber.

According to a yet further aspect of the present invention, there is provided an optical transmission system with a light branching and insertion apparatus, comprising a plurality of terminal stations, a plurality of optical transmission lines each formed from an optical fiber for connecting the terminal stations to each other, and a light branching and insertion apparatus provided at branching points of the optical transmission lines for allowing communication of signal light to be performed between the terminal stations via the optical transmission lines, the light branching and insertion apparatus including a branching element for outputting signal light of a first wavelength from within signal light inputted thereto from an input side optical fiber, which forms one of the optical transmission lines, to an output side optical fiber, which forms one of the optical transmission lines, and outputting signal light of the other wavelengths than the first wavelength from within the signal light inputted thereto from the input side optical fiber to a branching output side optical fiber, which forms one of the optical transmission lines, and an insertion element outputting signal light inputted thereto from a branching input side optical fiber, which forms one of the optical transmission lines, to an output side optical fiber, which forms one of the optical transmission lines, the branching element being formed from a dielectric multilayer film filter which functions, for the signal light of the first wavelength from within the signal light inputted thereto from the input side optical fiber, as a band-pass filter which outputs the signal light of the first wavelength to the output side optical fiber, but functions, for the signal light of the other wavelengths than the first wavelength from within the signal light inputted thereto from the input side optical fiber, as a band block filter which outputs the signal light of the other wavelengths to the branching output side optical fiber, the insertion element being formed from an optical wave combiner which functions as an optical coupler which outputs the signal light inputted thereto from the branching input side optical fiber to the output side optical fiber, the insertion element being provided in a stage following the branching element.

With the optical transmission system with a light branching and insertion apparatus, there is an advantage that branching and insertion of signal light upon transmission of signal light can be effected with a low loss and with a high degree of accuracy while simplifying the construction of optical transmission lines each formed from an optical fiber.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. First Embodiment

Figure 1:
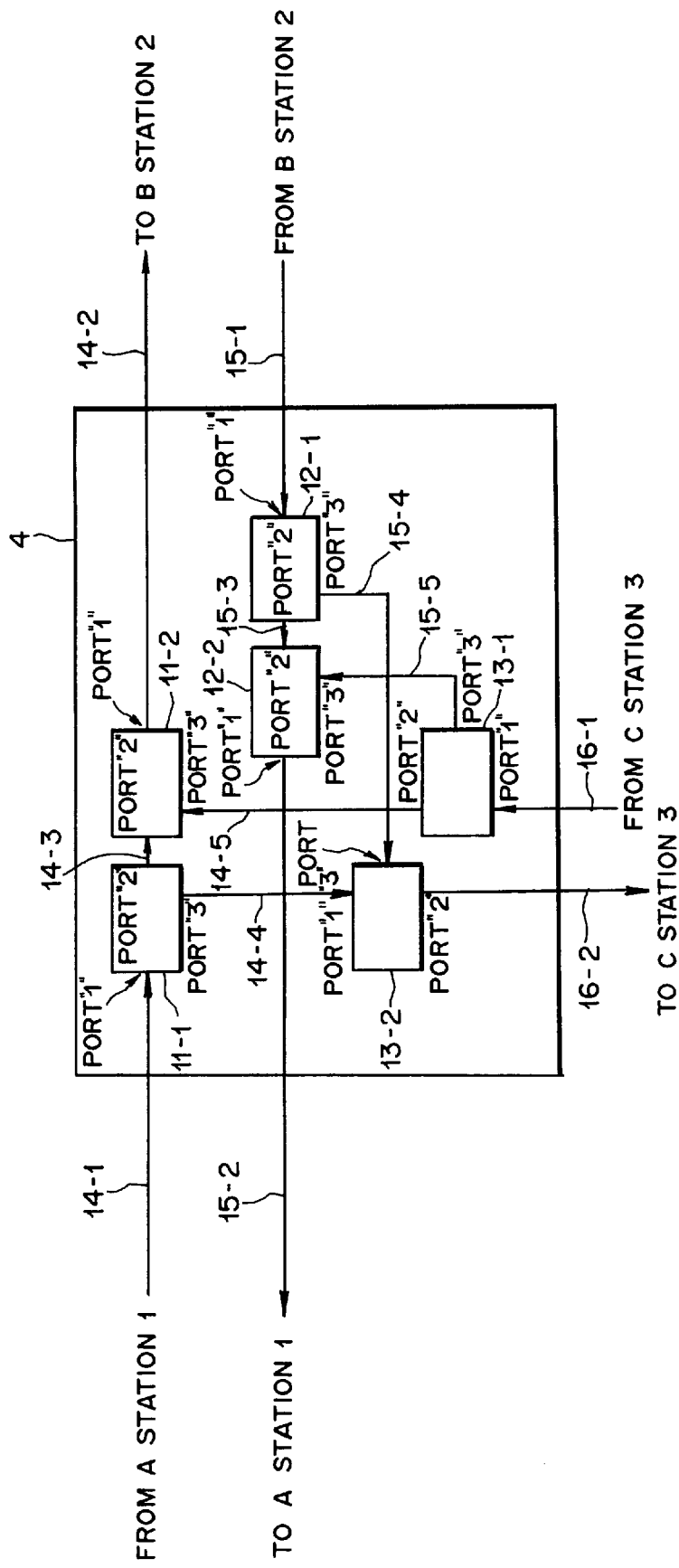
FIG. 1 is a block diagram showing a construction of a light branching and insertion apparatus according to a first preferred embodiment of the present invention.

FIG. 1 shows in block diagram a light branching and insertion apparatus according to a first preferred embodiment of the present invention.

Figure 2:
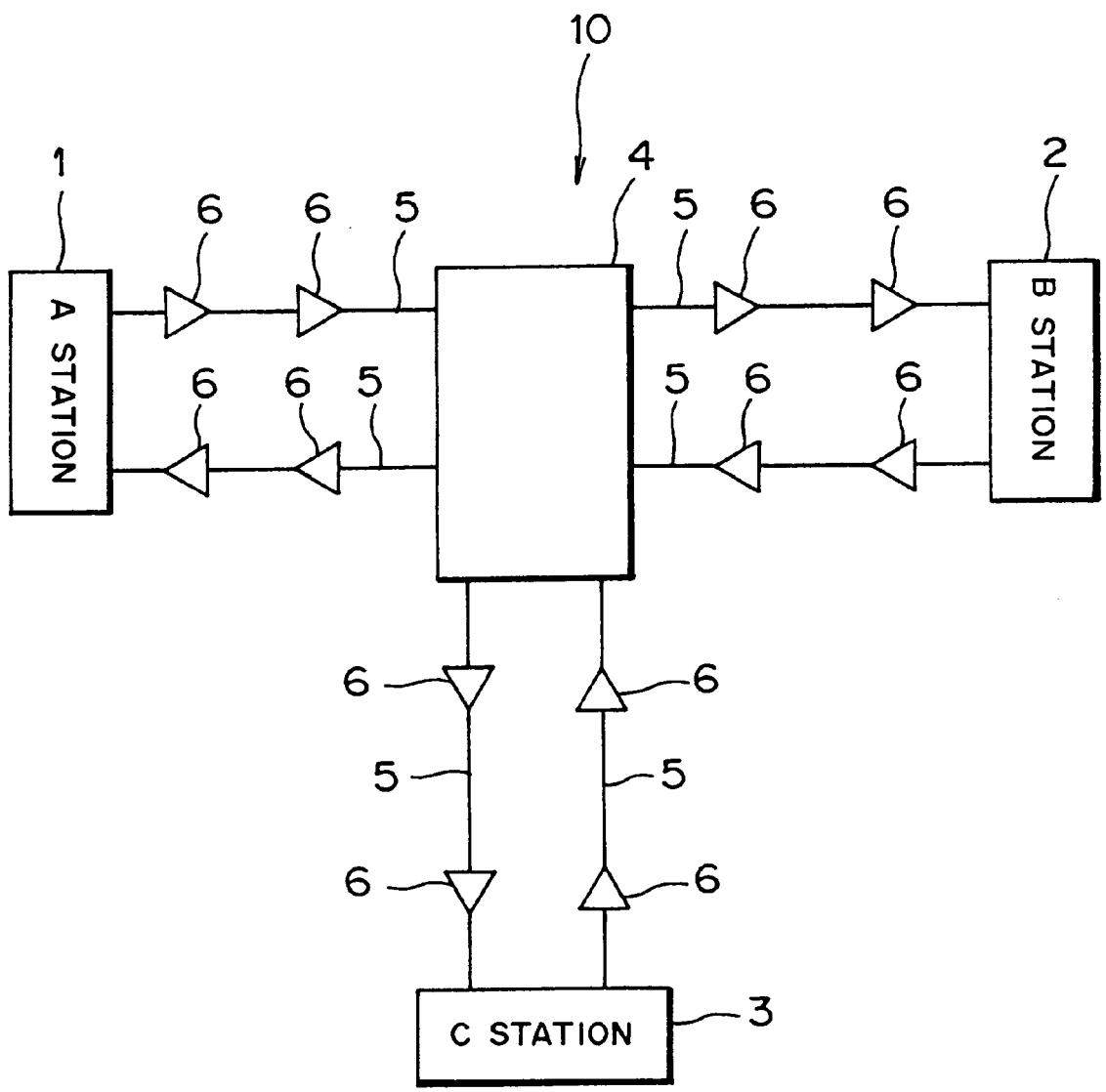
FIG. 2 is a block diagram showing a construction of an optical transmission system to which the light branching and insertion apparatus of FIG. 1 is applied.

Referring to FIG. 1, the light branching and insertion apparatus is generally denoted at 4 and is provided at branching points of optical transmission lines 5 which connect a plurality of terminal stations (in FIG. 2, an A station 1, a B station 2 and a C station 3) to each other in such an optical transmission system 10 as shown in FIG. 2. The light branching and insertion apparatus 4 outputs signal light of a desired wavelength inputted thereto from any of the terminal stations 1 to 3 to another desired one of the terminal stations 1 to 3 to allow transmission of the signal light between the desired ones of the terminal stations.

Each of the optical transmission lines 5 shown in FIG. 2 is formed from an optical fiber and includes a plurality of optical amplifiers 6 interposed therein for repeating and amplifying signal light to be transmitted.

As seen in FIG. 1, the light branching and insertion apparatus 4 includes a first branching element 11-1, a first insertion element 11-2, a second branching element 12-1, a second insertion element 12-2, a third branching element 13-1 and a third insertion element 13-2.

When signal light is inputted from an ascending input side optical fiber 14-1, the first branching element 11-1 outputs signal light of a desired wavelength from within the inputted signal light to the first insertion element 11-2 via another optical fiber 14-3, but outputs signal light of the other wavelengths than the desired wavelength from within the inputted signal light to the third insertion element 13-2 via a further optical fiber 14-4.

Figure 3A:
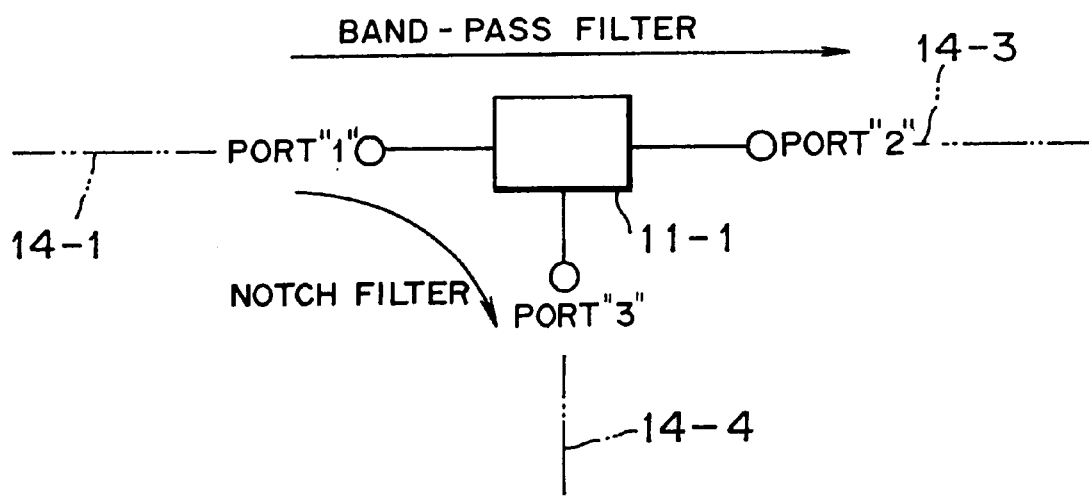
FIGS. 3(a) and 3(b) are diagrammatic views illustrating operations of dielectric multilayer film filters employed in the light branching and insertion apparatus of FIG. 1.

In particular, referring specifically to FIG. 3(a), the first branching element 11-1 is formed from a dielectric multilayer film filter which functions, for the signal light of the desired wavelength from within the signal light inputted thereto from the ascending input side optical fiber 14-1 through a port "1" thereof, a band-pass filter which outputs the signal light of the desired wavelength to an ascending output side optical fiber 14-2 through another port "2" thereof via the optical fiber 14-3 and the first insertion element 11-2, but functions, for the signal light of the other wavelengths than the desired wavelength from within the signal light inputted thereto from the ascending input side optical fiber 14-1 through the port "1", as a band block filter (notch filter) which outputs the signal light of the other wavelengths to a branching output side optical fiber 16-2 through a further port "3" thereof via the optical fiber 14-4 and the third insertion element 13-2. The dielectric multilayer filter will be hereinafter described in detail.

Meanwhile, the first insertion element 11-2 combines signal light inputted thereto from a branching input side optical fiber 16-1 via the third branching element 13-1 and an optical fiber 14-5 with signal light inputted thereto from the first branching element 11-1 via the optical fiber 14-3 and outputs the thus combined signal light to the ascending output side optical fiber 14-2.

Figure 3B:
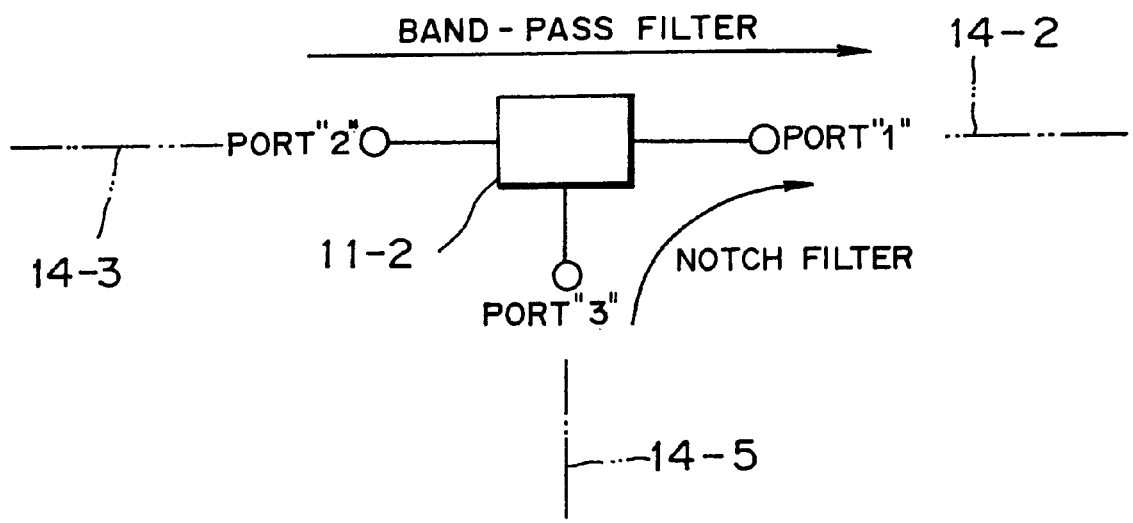

In particular, referring to FIG. 3(b), the first insertion element 11-2 is formed from a dielectric multilayer film filter which functions, for signal light inputted thereto from the optical fiber 14-3 through the port "2" thereof, a bandpass filter which outputs the signal light to the ascending output side optical fiber 14-2 through the port "1" thereof, but functions, for signal light inputted thereto from the branching input side optical fiber 16-1 through the port "3" thereof via the third branching element 13-1 and the optical fiber 14-5, as a band block filter (notch filter) which outputs the signal light to the ascending output side optical fiber 14-2 through the port "1".

Thus, the first insertion element 11-2 functions as an optical coupler which combines signal light inputted thereto through the port "2" thereof and signal light inputted thereto through the port "3" thereof with each other and outputs the combined signal light to the port "1" thereof.

It is to be noted that, since the dielectric multilayer film filters shown in FIGS. 3(a) and 3(b) individually have reversible characteristics, the first branching element 11-1 and the first insertion element 11-2 in the light branching and insertion apparatus 4 according to the present embodiment can be formed from dielectric multilayer filters of a same type.

When signal light is inputted from a descending input side optical fiber 15-1, the second branching element 12-1 outputs signal light of a desired length from within the inputted signal light to the second insertion element 12-2 via an optical fiber 15-3, but outputs signal light of the other wavelengths than the desired wavelength from within the inputted signal light to the third insertion element 13-2 via another optical fiber 15-4.

In particular, the second branching element 12-1 is formed from a dielectric multilayer film filter which functions, for the signal light of the desired wavelength from within the signal light inputted thereto from the descending input side optical fiber 15-1, a band-pass filter which outputs the signal light of the desired wavelength to a descending output side optical fiber 15-2 via the optical fiber 15-3 and the second insertion element 12-2, but functions, for the signal light of the other wavelengths than the desired wavelength from within the signal light inputted thereto from the descending output side optical fiber 15-2, as a band block filter which outputs the signal light of the other wavelengths to the branching output side optical fiber 16-2 via the optical fiber 15-4 and the third insertion element 13-2.

The second insertion element 12-2 combines signal light inputted thereto from the branching input side optical fiber 16-1 via the third branching element 13-1 and an optical fiber 15-5 with signal light inputted thereto from the second branching element 12-1 via the optical fiber 15-3 and outputs the thus combined signal light to the descending output side optical fiber 15-2.

In particular, the second insertion element 12-2 is formed from a dielectric multilayer film filter which functions as an optical coupler which outputs signal light inputted thereto from the branching input side optical fiber 16-1 to the descending output side optical fiber 15-2.

When signal light is inputted from the branching input side optical fiber 16-1, the third branching element 13-1 outputs signal light of a desired wavelength from within the inputted signal light to the first insertion element 11-2 via the optical fiber 14-5, but outputs signal light of the other wavelengths than the desired wavelength from within the inputted signal light to the second insertion element 12-2 via the optical fiber 15-5.

In particular, the third branching element 13-1 is formed from a dielectric multilayer film filter which functions, for the signal light of the desired wavelength from within the signal light inputted thereto from the branching input side optical fiber 16-1, a band-pass filter which outputs the signal light of the desired wavelength to the ascending output side optical fiber 14-2 via the optical fiber 14-5 and the first insertion element 11-2, but functions, for the signal light of the other wavelengths than the desired wavelength from within the signal light inputted thereto from the branching input side optical fiber 16-1, as a band block filter which outputs the signal light of the other wavelengths to the descending output side optical fiber 15-2 via the optical fiber 15-5 and the second insertion element 12-2.

The third insertion element 13-2 combines signal light inputted thereto from the descending input side optical fiber 15-1 via the second branching element 12-1 and the optical fiber 15-4 with signal light inputted thereto from the first branching element 11-1 via the optical fiber 14-4 and outputs the thus combined signal light to the branching output side optical fiber 16-2.

In particular, the third insertion element 13-2 is formed from a dielectric multilayer film filter which functions as an optical coupler which outputs signal light inputted thereto from the descending input side optical fiber 15-1 to the branching output side optical fiber 16-2.

It is to be noted that, in the light branching and insertion apparatus 4 of the present embodiment, a dielectric multilayer film filter of the same type as that of the dielectric multilayer film filter which forms such first branching element 11-1 as seen in FIG. 3(a) is used for the dielectric multilayer film filters which form the second and third branching elements 12-1 and 13-1 described hereinabove.

Further, a dielectric multilayer film filter of the same type as that of the dielectric multilayer film filter which forms such first insertion element 11-2 as seen in FIG. 3(b) is used for the dielectric multilayer film filters which form the second and third insertion elements 12-2 and 13-2 described hereinabove.

Since the light branching and insertion apparatus 4 according to the present embodiment is formed using dielectric multilayer film filters in this manner, it is possible to branch signal light of a plurality of wavelengths transmitted thereto from a single optical fiber depending upon the wavelength or insert signal light of a desired wavelength into signal light of a plurality of wavelengths transmitted thereto by a single optical fiber.

Figure 8:
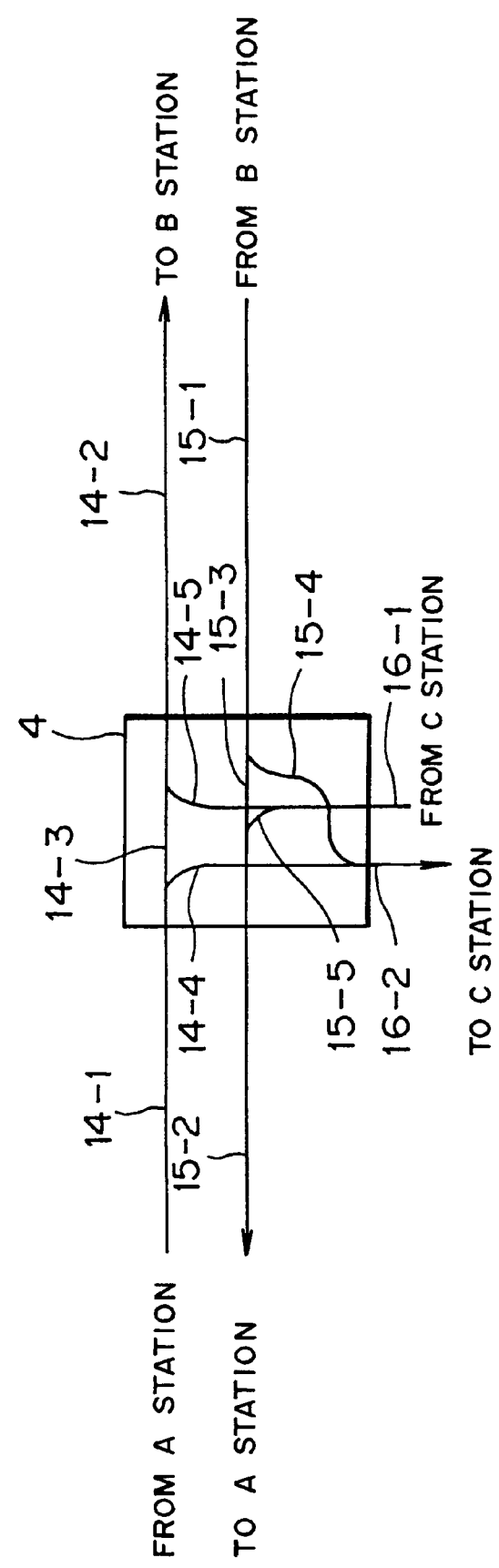
FIG. 8 is a diagrammatic view showing a construction of the light branching and insertion apparatus of FIG. 1.
Figure 16:
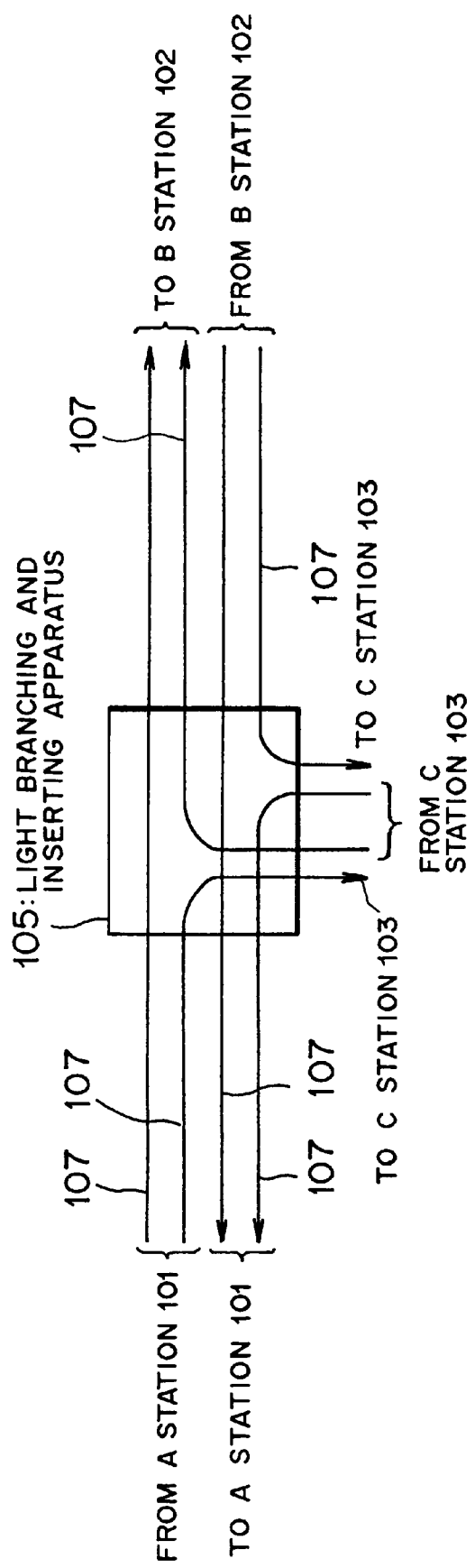
FIG. 16 is a diagrammatic view showing a construction of a light branching and insertion apparatus of FIG. 15.

Consequently, while optical transmission lines each formed from an optical fiber in a typical light branching and insertion apparatus are provided in an overlapping relationship between terminal stations (refer to FIG. 16), the light branching and insertion apparatus 4 according to the present embodiment can be constructed simply without allowing overlapping provision of optical transmission lines, each of which is formed from an optical fiber, between different terminal stations as seen in FIG. 8. It is to be noted that, in FIG. 8, those elements denoted by like reference characters to those in FIG. 1 have similar constructions and functions.

Here, the dielectric multilayer film filters described hereinabove will be described in more detail.

Figure 6:
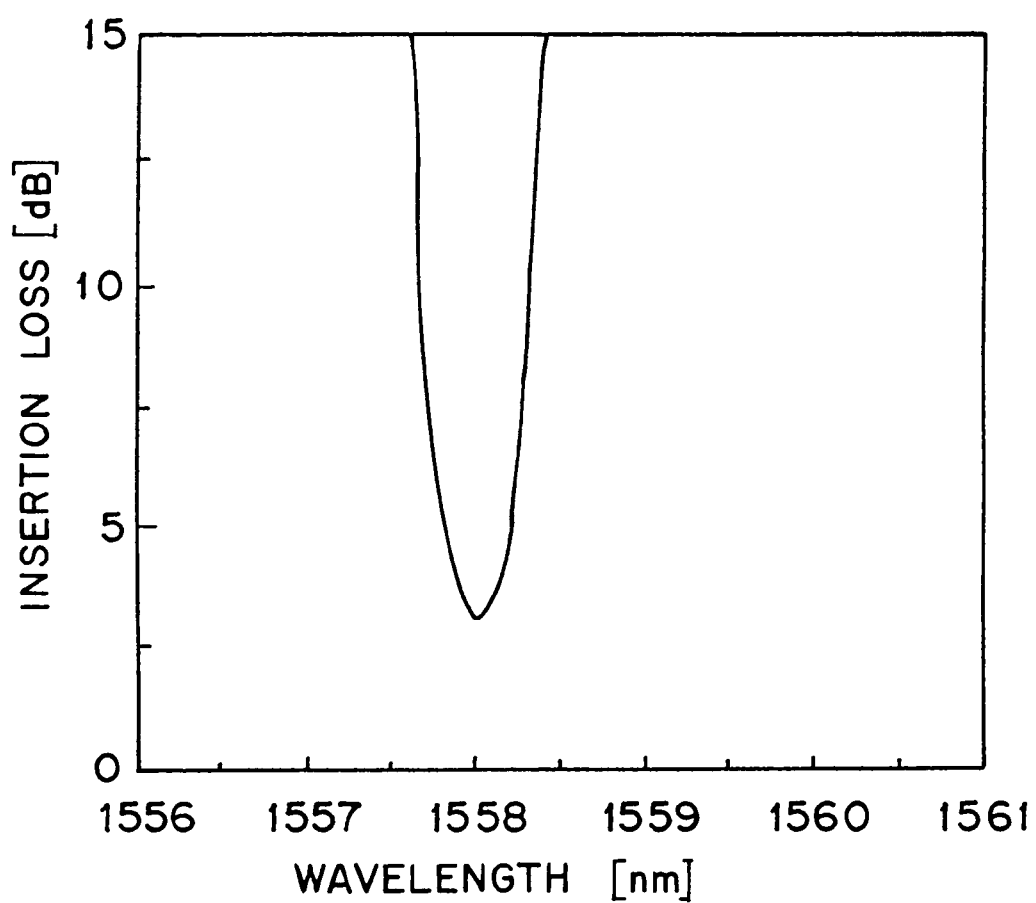
FIG. 6 is a diagram illustrating a wavelength characteristic of the dielectric multilayer film filter employed in the light branching and insertion apparatus of FIG. 1.
Figure 7:
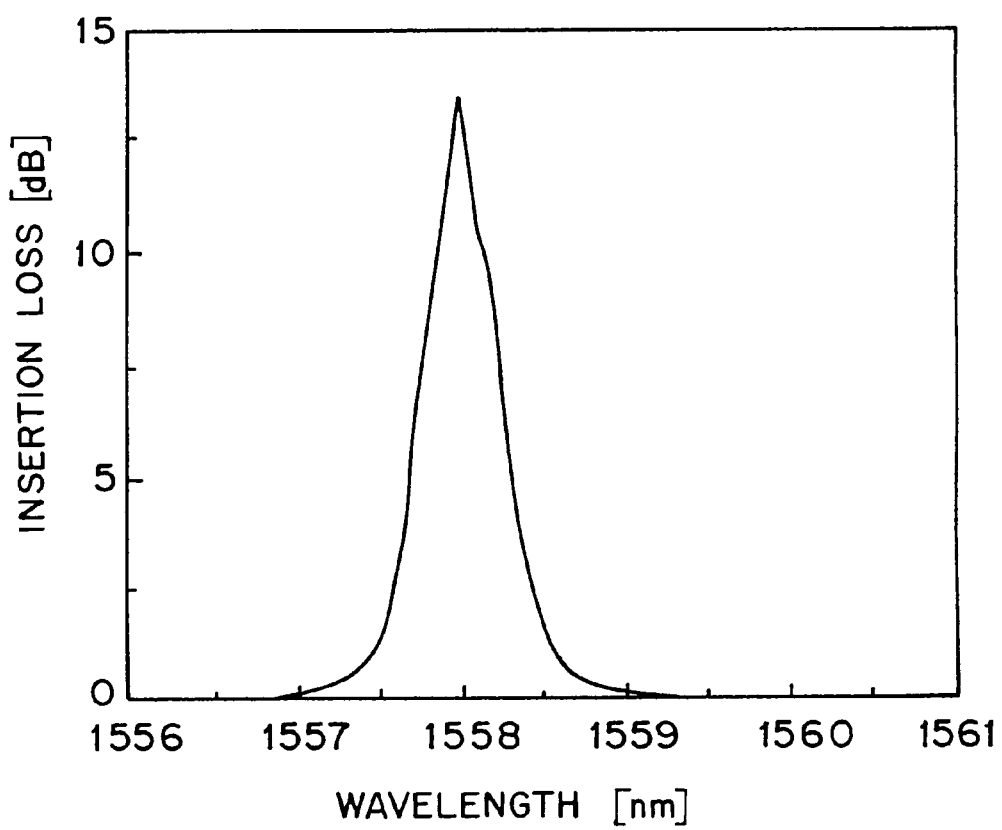
FIG. 7 is a diagram illustrating another wavelength characteristic of the dielectric multilayer film filter employed in the light branching and insertion apparatus of FIG. 1.

Each of the dielectric multilayer film filters is formed as such a 3-port type optical filter as shown in FIG. 3(a) or 3(b). For example, the dielectric multilayer film filter shown in FIG. 3(a) has, between the port "1" and the port "2" thereof, such a wavelength characteristic of a band-pass filter having a center wavelength of 1,558 nm as shown in FIG. 6, but has, between the port "1" and the port "3" thereof, a wavelength characteristic of a band block filter having a center wavelength of 1,558 nm as shown in FIG. 7. It is to be noted that each of FIGS. 6 and 7 illustrates a relationship between the wavelength of signal light and the insertion loss of signal light at the wavelength.

If signal light is inputted from the port "1" to the dielectric multilayer film filter described above, then the signal light of the wavelength of 1,558 nm is outputted to the port "2" while the signal light of the other wavelengths than 1,558 nm is outputted to the port "3". Consequently, branching of the signal light is performed depending upon the wavelength. It is to be noted that the dielectric multilayer film filter also effects insertion of signal light simultaneously.

While such branching and insertion of signal light can be performed also by means of an optical coupler, since the optical coupler exhibits a high loss when it effects branching and insertion of signal light, if a light branching and insertion apparatus is constructed using this optical coupler, then also the loss of signal light transmitted via the light branching and insertion apparatus exhibits a high loss.

Therefore, in the present embodiment, the light branching and insertion apparatus 4 is formed using dielectric multilayer film filters which exhibit a loss of signal light lower than optical couplers so that the loss of signal light transmitted via the light branching and insertion apparatus 4 may be low.

Figure 5:
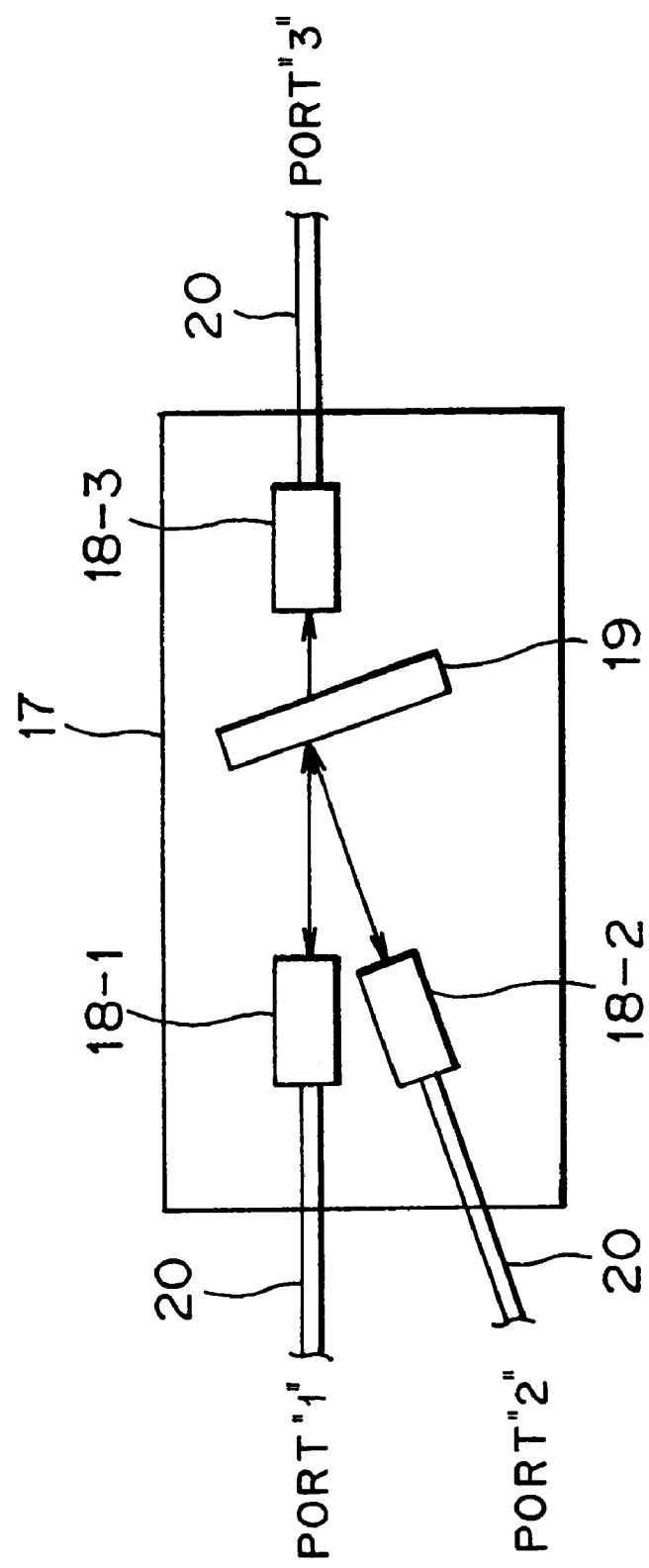
FIG. 5 is a block diagram showing a construction of the dielectric multilayer film filter employed in the light branching and insertion apparatus of FIG. 1.

More particularly, referring to FIG. 5, each of the dielectric multilayer film filters is composed of lenses 18-1 to 18-3 and a dielectric multilayer film 19. It is to be noted that reference numeral 20 denotes an optical fiber.

The lenses 18-1 to 18-3 are collimate lenses individually attached to the optical fibers 20 in order to assure high convergency of signal light. The dielectric multilayer film 19 actually has a function as a band-pass filter which passes signal light therethrough or another function as a band block filter which reflects signal light depending upon the wavelength of signal light inputted thereto.

Where the dielectric multilayer film filter 17 of FIG. 5 having the construction described above is used for the first to third branching elements 11-1 to 13-1, signal light is inputted through the port "1", and the branched signal light is outputted through the port "3" while the signal light other th an the branched signal light is outputted through the port "2".

On the other hand, where the dielectric multi layer film filter 17 is used for the first to third insertion elements 11-2 to 13-2, signal light is inputted through the port "2" and signal light to be inserted is inputted through the port "3", and the combined signal light of the inputted signal light and the signal light to be inserted is outputted through the port "1".

Signal light branching and insertion operations where the dielectric multilayer film filter 17 having such a construction as described above is used will be described with reference to FIG. 4.

Figure 4:
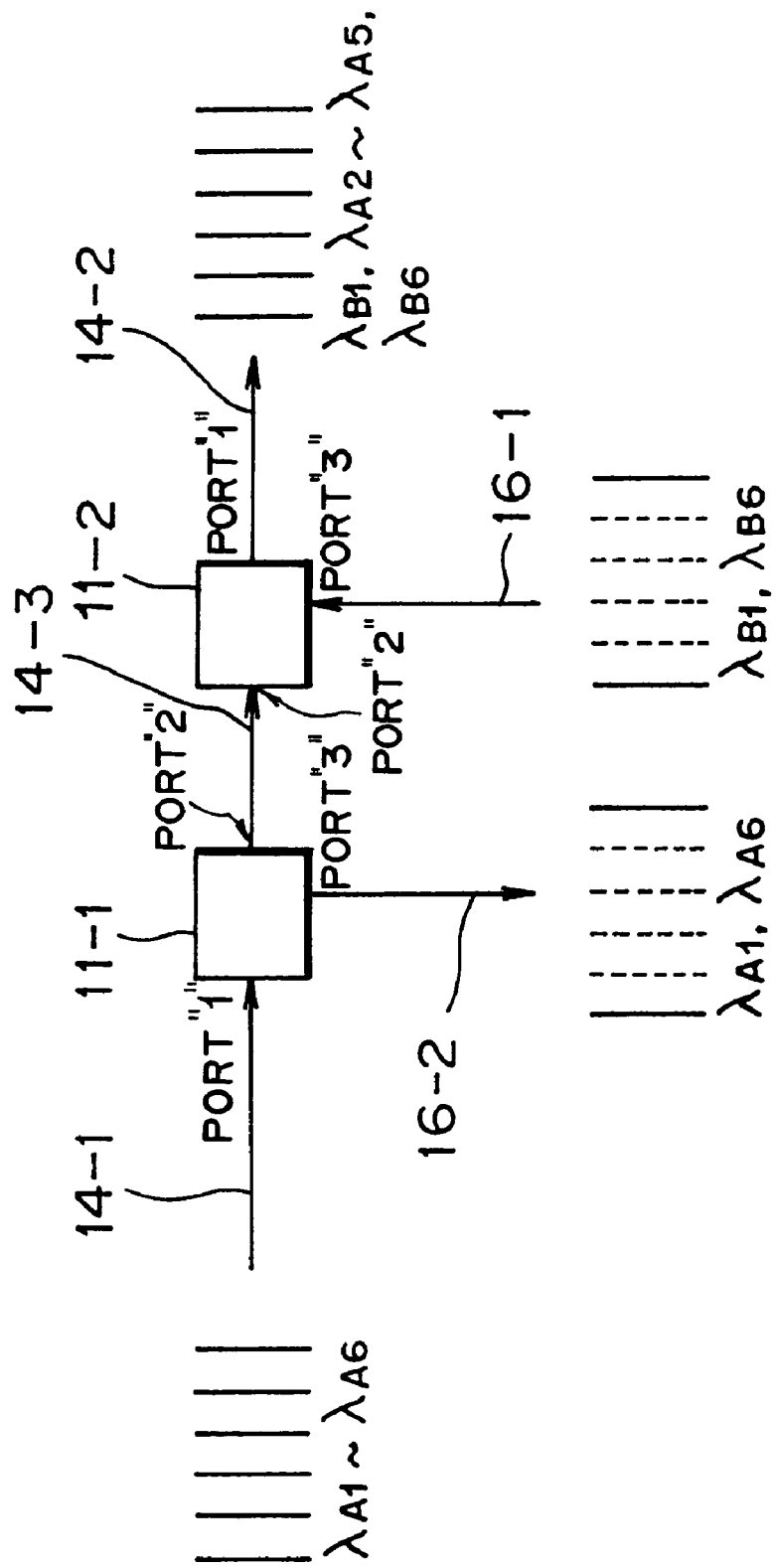
FIG. 4 is a diagrammatic view illustrating the operations of the dielectric multilayer film filters employed in the light branching and insertion apparatus of FIG. 1.

In FIG. 4, the first branching element 11-1 and the first insertion element 11-2 are shown as examples of a branching element which branches signal light and an insertion element which inserts signal light, respectively, and branching and insertion of signal light by the first branching element 11-1 and the first insertion element 11-2 is illustrated.

As seen in FIG. 4, if signal lights $\lambda_{A1}$ to $\lambda_{A6}$ are inputted from the ascending input side optical fiber 14-1 to the port "1" of the first branching element 11-1, then the first branching element 11-1 outputs the signal lights $\lambda_{A2}$ to $\lambda_{A5}$ from the port "2" thereof to the optical fiber 14-3, but branches the signal lights $\lambda_{A1}$ and $\lambda_{A6}$ and outputs them from the port "3" thereof to the branching output side optical fiber 16-2.

Then, when the signal lights $\lambda_{A2}$ to $\lambda_{A5}$ are inputted from the optical fiber 14-3 to the port "2" of the first insertion element 11-2 and signal lights $\lambda_{B1}$ and $\lambda_{B6}$ to be inserted are inputted from the branching input side optical fiber 16-1 to the port "3" of the first insertion element 11-2, the first insertion element 11-2 combines the signal lights $\lambda_{A2}$ to $\lambda_{A5}$ and the signal lights $\lambda_{B1}$ and $\lambda_{B6}$ with each other and outputs them from the port "1" thereof to the ascending output side optical fiber 14-2.

It is to be noted that also the second branching element 12-1 and the second insertion element 12-2 or the third branching element 13-1 and the third insertion element 13-2 effect branching and insertion of signal lights in a similar manner as in the first branching element 11-1 and the first insertion element 11-2.

In the light branching and insertion apparatus 4 according to the present embodiment which have the construction as described above, if signal light is inputted from the ascending input side optical fiber 14-1, then the light branching and insertion apparatus 4 outputs signal light of a desired wavelength from within the inputted signal light to the ascending output side optical fiber 14-2 via the first branching element 11-1 and the first insertion element 11-2, but outputs signal light of the other wavelengths than the desired wavelength from within the inputted signal light to the branching output side optical fiber 16-2 via the first branching element 11-1 and the third insertion element 13-2.

Meanwhile, the light branching and insertion apparatus 4 outputs signal light of the desired wavelength from within signal lights inputted therefrom from the branching input side optical fiber 16-1 to the ascending output side optical fiber 14-2 via the third branching element 13-1 and the first insertion element 11-2.

Further, if signal light is inputted from the descending input side optical fiber 15-1, then the light branching and insertion apparatus 4 outputs signal light of the desired wavelength from within the inputted signal light to the descending output side optical fiber 15-2 via the second branching element 12-1 and the second insertion element 12-2, but outputs signal light of the other wavelengths than the desired wavelength from within the inputted signal light to the branching output side optical fiber 16-2 via the second branching element 12-1 and the third insertion element 13-2.

Furthermore, the light branching and insertion apparatus 4 outputs signal light of the other wavelengths than the desired wavelength from within the signal light inputted from the branching input side optical fiber 16-1 to the descending output side optical fiber 15-2 via the third branching element 13-1 and the second insertion element 12-2.

Since the light branching and insertion apparatus according to the present invention includes the first to third branching elements 11-1 to 13-1 and the first to third insertion elements 11-2 to 13-2 each formed from the dielectric multilayer film filter 17, branching and insertion of signal light upon transmission of the signal light can be effected with a low loss and with a high degree of accuracy while simplifying the construction of optical transmission lines each formed from an optical fiber.

Consequently, where the light branching and insertion apparatus 4 according to the present embodiment is applied to an optical transmission system which effects long haul communication such as, for example, submarine optical communication, the number of optical fiber cables to be laid on the bottom of a sea can be reduced to achieve significant reduction of the cost.

Further, since the light branching and insertion apparatus 4 according to the present embodiment employs a dielectric multilayer film filter which is an optical filter of the passive type, branching and insertion of signal light can be effect without application of any voltage, and the light branching and insertion apparatus 4 operates stably also in an optical transmission system which effects submarine optical communication.

a1. First Modification to First Embodiment

Figure 9:
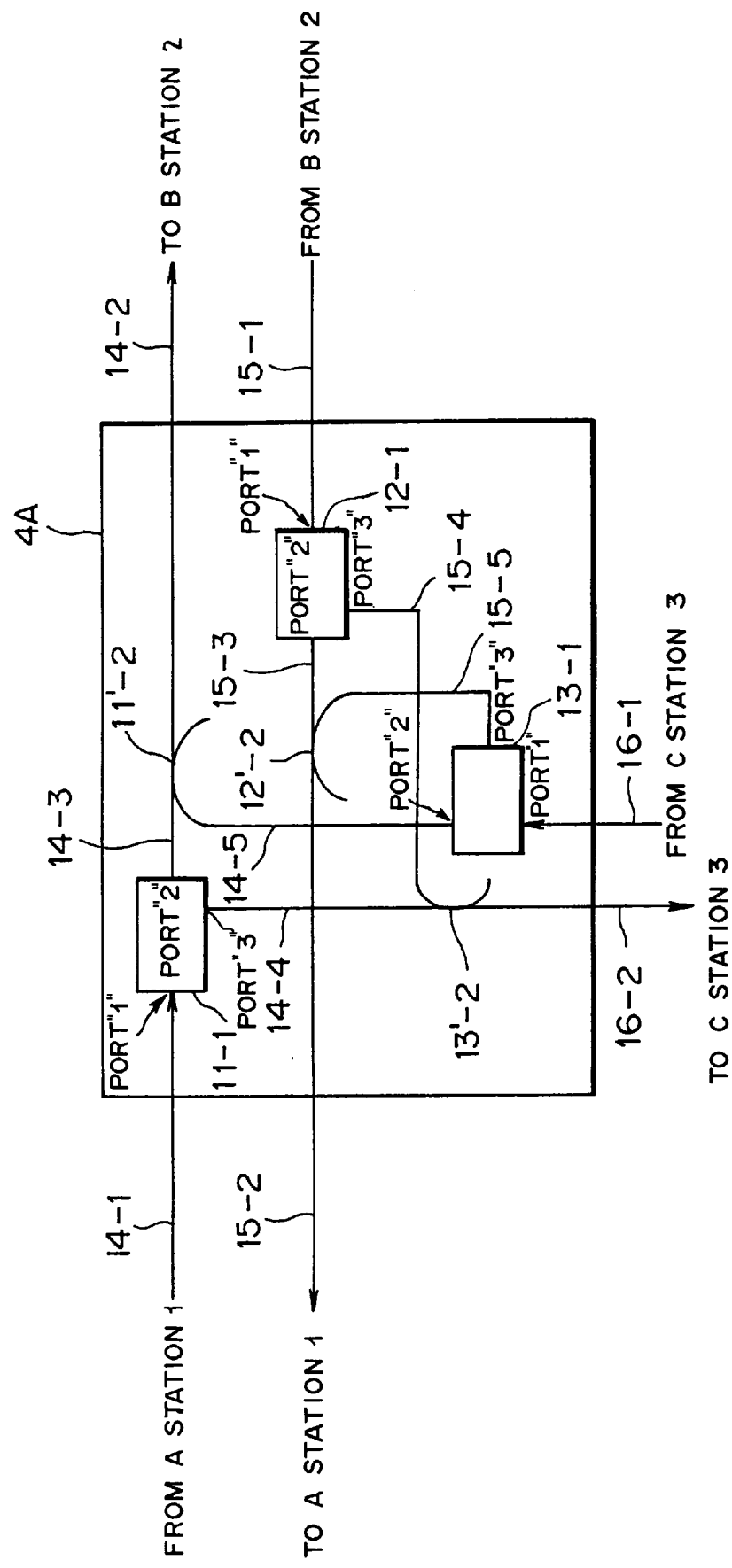
FIG. 9 is a block diagram showing a construction of a modification to the light branching and insertion apparatus of FIG. 1.

FIG. 9 shows in block diagram a light branching and insertion apparatus according to a first modification to the first embodiment of the present invention. Also the light branching and insertion apparatus 4A shown in FIG. 9 is provided, similarly to the light branching and insertion apparatus 4 according to the first embodiment described above, at branching points of optical transmission lines which interconnect a plurality of terminal stations so that signal light may be transmitted between the terminal stations via the optical transmission lines.

Referring to FIG. 9, the light branching and insertion apparatus 4A shown includes a first branching element 11-1, a first insertion element 11'-2, a second branching element 12-1, a second insertion element 12'-2, a third branching element 13-1 and a third insertion element 13'-2.

The first to third branching elements 11-1 to 13-1 are each formed from a dielectric multilayer film filter similarly to the first to third branching elements 11-1 to 13-1 in the first embodiment and have similar functions to those of the first to third branching elements 11-1 to 13-1 in the first embodiment, respectively.

The first to third insertion elements 11'-2 to 13'-2 have similar functions to those of the first to third insertion elements 11-2 to 13-2 in the first embodiment, respectively, but are each formed from an optical wave combiner differently from the first to third insertion elements 11-2 to 13-2 in the first embodiment. For the optical wave combiner, for example, an optical coupler of the fusion connection type can be used. It is to be noted that the first and second insertion elements 11'-2 and 12'-2 are provided in stages following the first and second branching elements 11-1 and second branching element 12-1, respectively.

Also in the light branching and insertion apparatus 4A according to the first modification to the first embodiment having the construction described above, similarly as in the light branching and insertion apparatus 4 according to the first embodiment, if signal light is inputted from the ascending input side optical fiber 14-1, then the light branching and insertion apparatus 4A outputs signal light of a desired wavelength from within the inputted signal light to the ascending output side optical fiber 14-2 via the first branching element 11-1 and the first insertion element 11'-2, but outputs signal light of the other wavelengths than the desired wavelength from within the inputted signal light to the branching output side optical fiber 16-2 via the first branching element 11-1 and the third insertion element 13'-2.

Meanwhile, the light branching and insertion apparatus 4A outputs signal light of the desired wavelength from within signal light inputted from the branching input side optical fiber 16-1 to the ascending output side optical fiber 14-2 via the third branching element 13-1 and the first insertion element 11'-2.

Further, if signal light is inputted from the descending input side optical fiber 15-1, then the light branching and insertion apparatus 4A outputs signal light of the desired wavelength from within the inputted signal light to the descending output side optical fiber 15-2 via the second branching element 12-1 and the second insertion element 12'-2, but outputs signal light of the other wavelengths than the desired wavelength from within the inputted signal light to the branching output side optical fiber 16-2 via the second branching element 12-1 and the third insertion element 13'-2.

Further, the light branching and insertion apparatus 4A outputs signal light of the other wavelengths than the desired wavelength from within the signal light inputted from the branching input side optical fiber 16-1 to the descending output side optical fiber 15-2 via the third branching element 13-1 and the second insertion element 12'-2.

Since the light branching and insertion apparatus 4A according to the first modification to the first embodiment includes the first to third branching elements 11-1 to 13-1 each formed from the dielectric multilayer film filter 17 and the first to third insertion elements 11'-2 to 13'-2 each formed from an optical wave combiner in this manner, the light branching and insertion apparatus 4A has similar advantages to those of the light branching and insertion apparatus 4 according to the first embodiment.

Further, since the first to third insertion elements 11'-2 to 13'-2 in the light branching and insertion apparatus 4A according to the first modification to the first embodiment are each formed from an optical wave combiner, although the light branching and insertion apparatus 4A exhibits a loss of signal light a little higher than that of the light branching and insertion apparatus 4 according to the first embodiment, the light branching and insertion apparatus 4A is simplified in construction comparing with the light branching and insertion apparatus 4.

a2. Second Modification to First Embodiment

Figure 10:
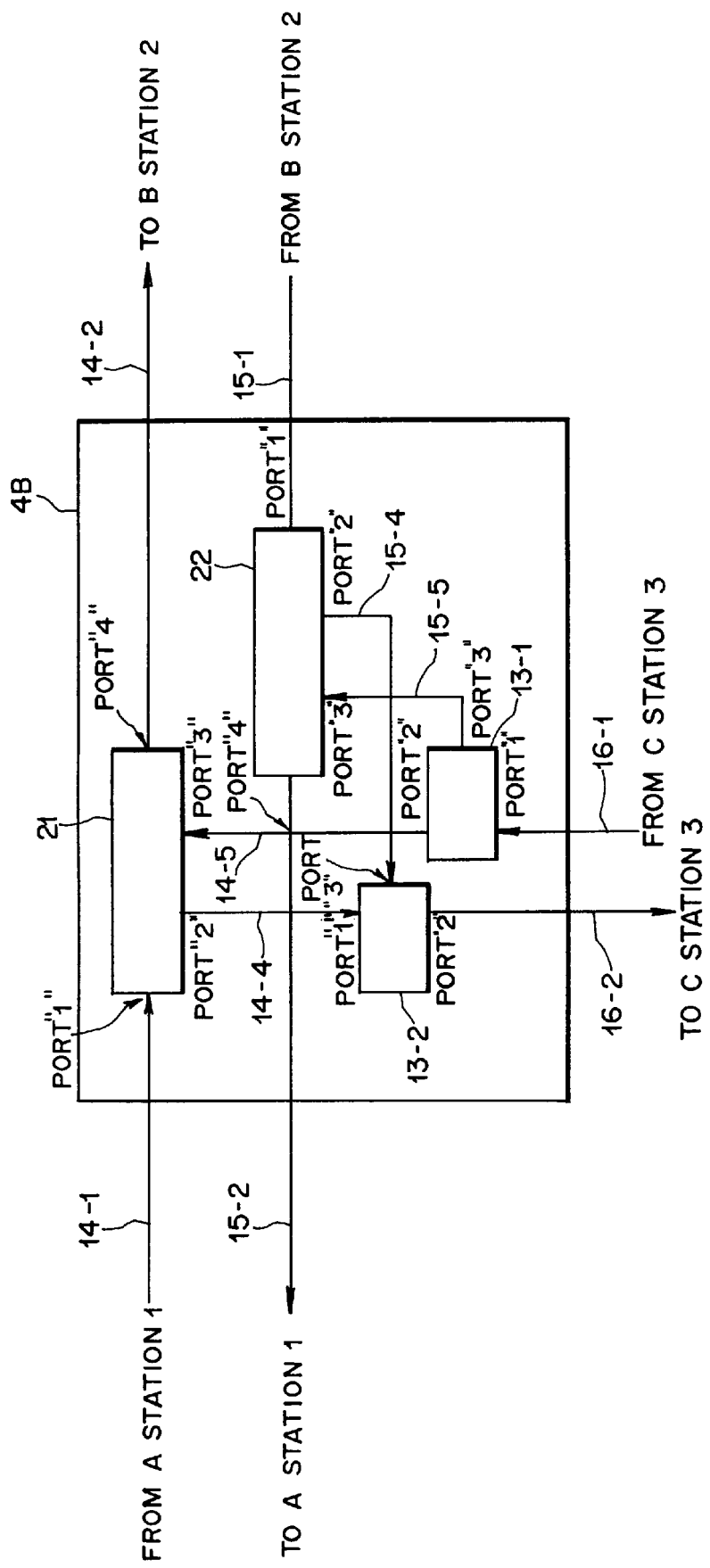
FIG. 10 is a similar view but showing a construction of another modification to the light branching and insertion apparatus of FIG. 1.

Referring now to FIG. 10, there is shown in block diagram a light branching and insertion apparatus according to a second modification to the first embodiment of the present invention. Also the light branching and insertion apparatus 4B shown in FIG. 10 is provided, similarly to the light branching and insertion apparatus 4 according to the first embodiment described above, at branching points of optical transmission lines which interconnect a plurality of terminal stations so that signal light may be transmitted between the terminal stations via the optical transmission lines.

Referring to FIG. 10, the light branching and insertion apparatus 4B shown includes a first branching and insertion element 21, a second branching and insertion element 22, a third branching element 13-1 and a third insertion element 13-2.

The third branching element 13-1 and the third insertion element 13-2 are each formed from a dielectric multilayer film filter similarly to the third branching element 13-1 and the third insertion element 13-2 in the first embodiment and have similar functions to those of the third branching element 13-1 and the third insertion element 13-2 in the first embodiment, respectively. It is to be noted that the third insertion element 13-2 may be formed from an optical wave combiner similarly to the third insertion element 13'-2 in the first modification to the first embodiment.

Figure 11:
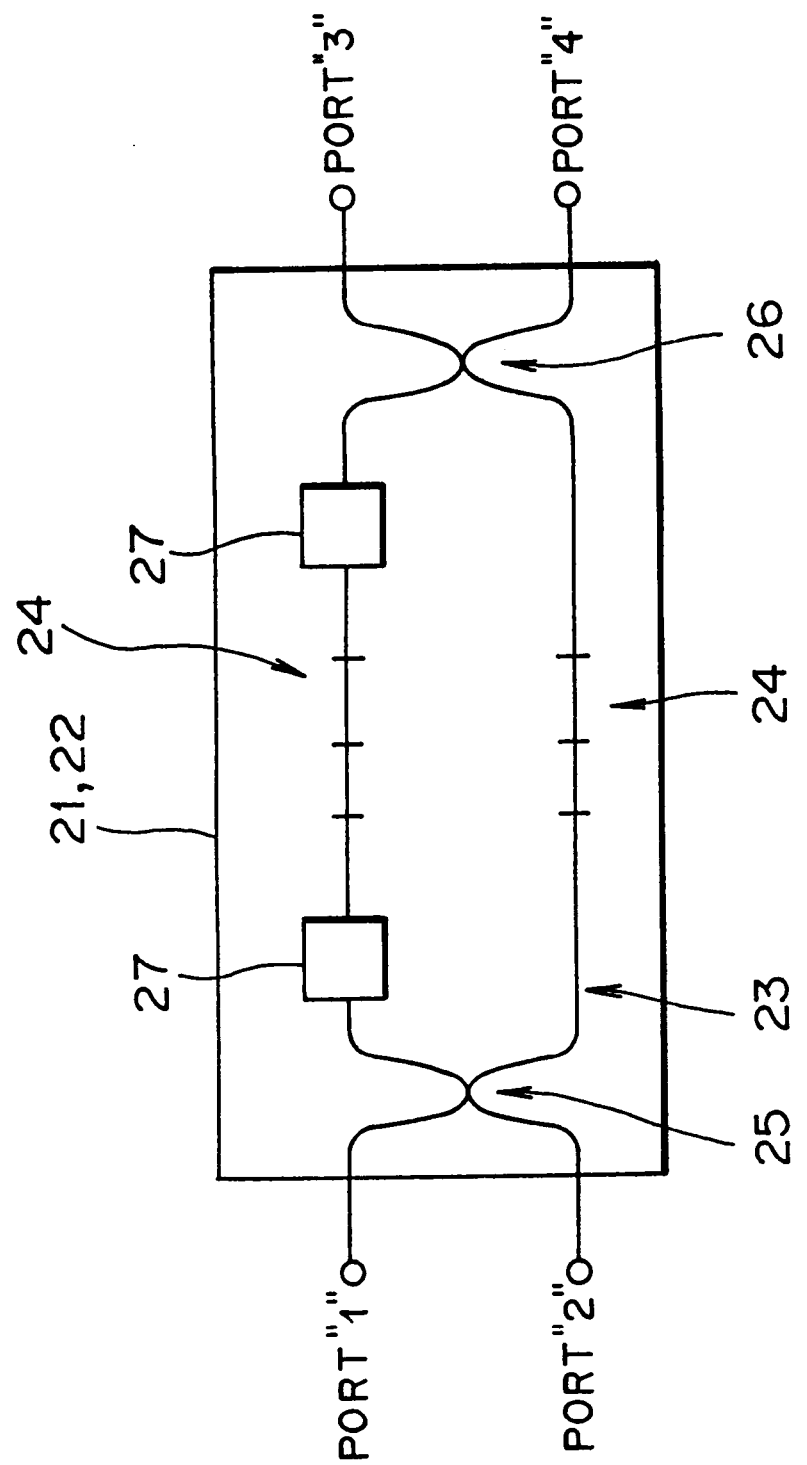
FIG. 11 is a block diagram showing a construction of a fiber grating filter employed in the modified light branching and insertion apparatus of FIG. 10.

Each of the first branching and insertion element 21 and the second branching and insertion element 22 effects, when signal light of a plurality of wavelengths is inputted thereto, branching and insertion of the signal light depending upon the wavelength, and is formed from such a fiber grating filter as shown in FIG. 11.

Referring to FIG. 11, the fiber grating filter includes two buses of a Mach-Zehnder interferometer 23 on which gratings 24 which reflect signal light of a desired wavelength are formed by UV (ultraviolet) light exposure (UV trimmings 27).

The fiber grating filter further includes a branching element 25 and an insertion element 26 each formed from an optical coupler.

In the fiber grating filter, where the gratings 24, for example, of a Bragg wavelength $\lambda_B$ are formed, when signal lights $\lambda_A$ to $\lambda_D$ of a plurality of different wavelengths are inputted from a port "1", the branching element 25 outputs the signal lights $\lambda_A$, $\lambda_C$ and $\lambda_D$ to another port "4", but reflects, at the gratings 24 thereof, the signal light $\lambda_B$ to branch and output it to a further port "2".

Then, when signal light $\lambda_B$ is inputted from a still further port "3", the insertion element 26 combines the signal light $\lambda_B$ with the signal lights $\lambda_A$, $\lambda_C$ and $\lambda_D$ and outputs the combined light to the port "4".

Also in the light branching and insertion apparatus 4B according to the second modification to the first embodiment having the construction described above, similarly as in the light branching and insertion apparatus 4 according to the first embodiment, if signal light is inputted from the ascending input side optical fiber 14-1, then the light branching and insertion apparatus 4B outputs signal light of a desired wavelength from within the inputted signal light to the ascending output side optical fiber 14-2 via the first branching and insertion element 21, but outputs signal light of the other wavelengths than the desired wavelength from within the inputted signal light to the branching output side optical fiber 16-2 via the first branching and insertion element 21 and the third insertion element 13-2.

Meanwhile, the light branching and insertion apparatus 4B outputs signal light of the desired wavelength from within signal light inputted thereto from the branching input side optical fiber 16-1 to the ascending output side optical fiber 14-2 via the third branching element 13-1 and the first branching and insertion element 21.

Further, if signal light is inputted from the descending input side optical fiber 15-1, then the light branching and insertion apparatus 4B outputs signal light of the desired wavelength from within the inputted signal light to the descending output side optical fiber 15-2 via the second branching and insertion element 22, but outputs signal light of the other wavelengths than the desired wavelength from within the inputted signal light to the branching output side optical fiber 16-2 via the second branching and insertion element 22 and the third insertion element 13-2.

Further, the light branching and insertion apparatus 4B outputs signal light of the other wavelengths than the desired wavelength from within the signal light inputted from the branching input side optical fiber 16-1 to the descending output side optical fiber 15-2 via the third branching element 13-1 and the second branching and insertion element 22.

Since the light branching and insertion apparatus 4B according to the second modification to the first embodiment includes the first and second branching and insertion elements 21 and 22 each formed from a fiber grating filter and the third branching element 13-1 and the third insertion element 13-2 each formed from a dielectric multilayer film filter in this manner, the light branching and insertion apparatus 4B has similar advantages to those of the light branching and insertion apparatus 4 according to the first embodiment.

Further, since the first and second branching and insertion elements 21 and 22 of the light branching and insertion apparatus 4B according to the second modification to the first embodiment are each formed from a fiber grating filter, although the light branching and insertion apparatus 4B exhibits a loss of signal light a little higher than that of the light branching and insertion apparatus 4 according to the first embodiment, the light branching and insertion apparatus 4B is simplified in construction comparing with the light branching and insertion apparatus 4.

It is to be noted that each of the first branching and insertion element 21 and the second branching and insertion element 22 may alternatively be formed from a waveguide type grating filter wherein an optical fiber in a fiber grating filter is replaced by an optical waveguide, and also in this instance, although the light branching and insertion apparatus 4B exhibits a loss of signal light a little higher than that of the light branching and insertion apparatus 4 according to the first embodiment, the light branching and insertion apparatus 4B is simplified in construction comparing with the light branching and insertion apparatus 4.

b. Second Embodiment

Figure 12:
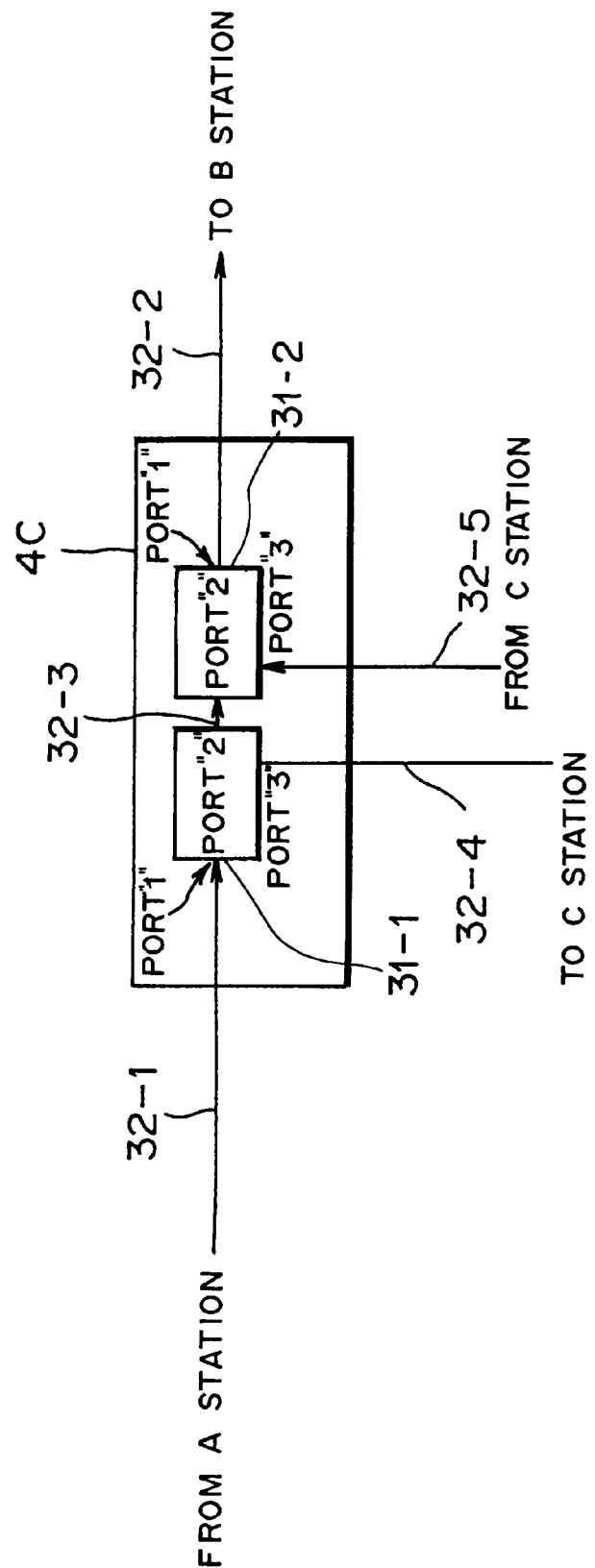
FIG. 12 is a block diagram showing a construction of a light branching and insertion apparatus according to a second preferred embodiment of the present invention.

FIG. 12 shows in block diagram a light branching and insertion apparatus according to a second preferred embodiment of the present invention.

Figure 13:
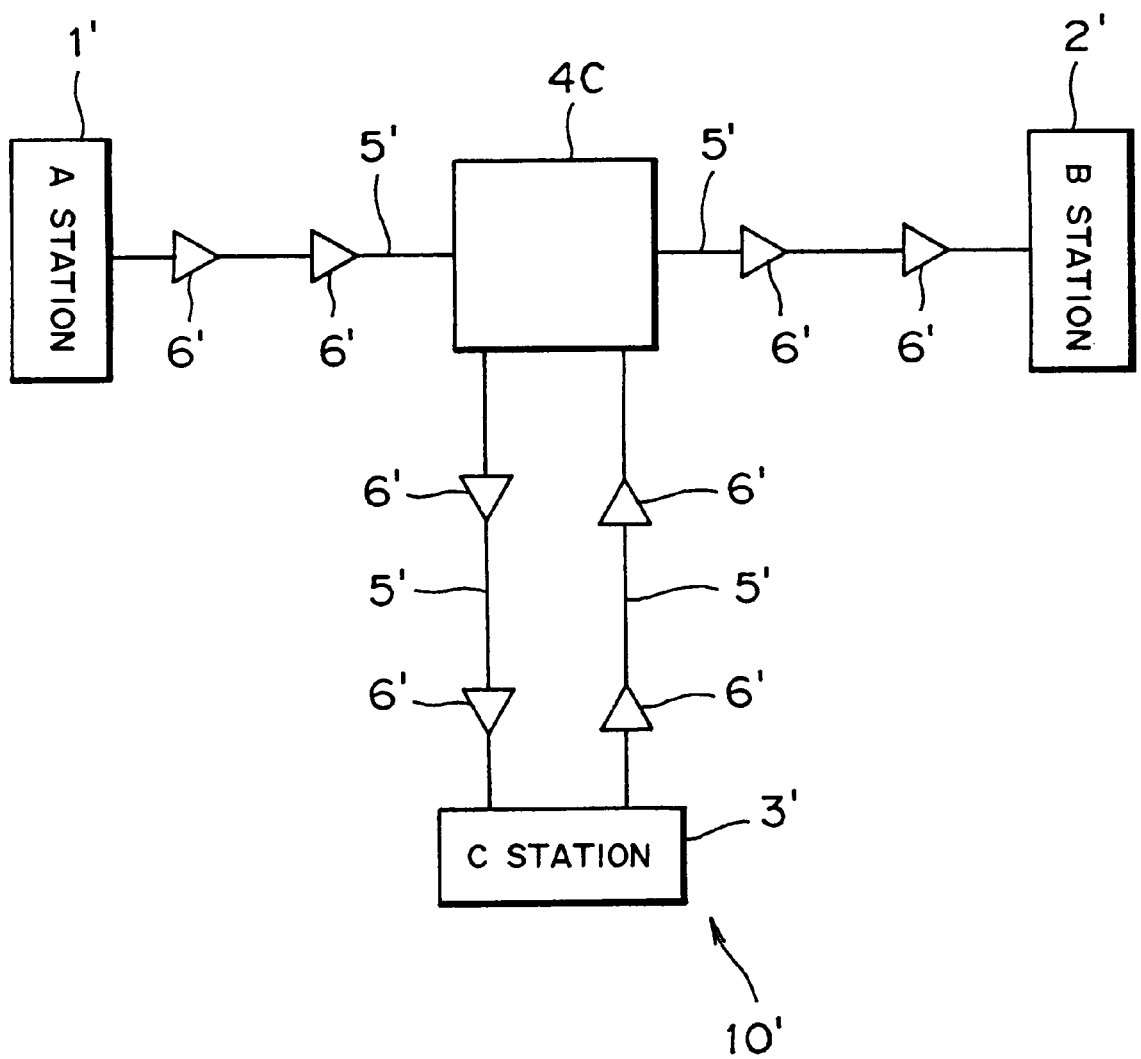
FIG. 13 is a block diagram showing an optical transmission system to which the light branching and insertion apparatus of FIG. 12 is applied.

Referring to FIG. 12, the light branching and insertion apparatus is generally denoted at 4C and is provided at branching points of optical transmission lines 5' which connect a plurality of terminal stations (in FIG. 13, an A station 1', a B station 2' and a C station 3') to each other in such an optical transmission system 10' as shown in FIG. 13. The light branching and insertion apparatus 4C outputs signal light of a desired wavelength inputted from any of the terminal stations 1' to 3' to another desired one of the terminal stations 1' to 3' to allow transmission of the signal light between the desired ones of the terminal stations.

Each of the optical transmission lines 5' shown in FIG. 13 is formed from an optical fiber and includes a plurality of optical amplifiers 6' interposed therein for repeating and amplifying signal light to be transmitted in a plurality of stages.

As seen in FIG. 12, the light branching and insertion apparatus 4C includes a branching element 31-1 and an insertion element 31-2.

When signal light is inputted from an input side optical fiber 32-1, the branching element 31-1 outputs signal light of a desired wavelength from within the inputted signal light to the insertion element 31-2 via another optical fiber 32-3, but outputs signal light of the other wavelengths than the desired wavelength from within the inputted signal light to a branching output side optical fiber 32-4.

In particular, the branching element 31-1 is formed from a dielectric multilayer film filter which functions, for the signal light of the desired wavelength from within the signal light inputted thereto from the input side optical fiber 32-1 through a port "1", a band-pass filter which outputs the signal light of the desired wavelength to an output side optical fiber 32-2 through another port "2" via the optical fiber 32-3 and the insertion element 31-2, but functions, for the signal light of the other wavelengths than the desired wavelength from within the signal light inputted thereto from the input side optical fiber 32-1 through the port "1", as a band block filter (notch filter) which outputs the signal light of the other wavelengths to the branching output side optical fiber 32-4 through a further port "3".

Meanwhile, the insertion element 31-2 combines signal light inputted thereto from a branching input side optical fiber 32-5 with signal light inputted thereto from the branching element 31-1 via the optical fiber 32-3 and outputs the thus combined signal light to the output side optical fiber 32-2.

In particular, the insertion element 31-2 is formed from a dielectric multilayer film filter which functions, for the signal light inputted thereto from the optical fiber 32-3 through the port "2", a band-pass filter which outputs the signal light to the output side optical fiber 32-2 through the port "1", but functions, for the signal light inputted thereto from the branching input side optical fiber 32-5 through the port "3", as a band block filter (notch filter) which outputs the signal light to the output side optical fiber 32-2 through the port "1".

Thus, the insertion element 31-2 functions as an optical coupler which combines signal light inputted thereto from the port "2" and signal light inputted thereto from the port "3" with each other and outputs the combined signal light to the port "1".

It is to be noted that, as the dielectric multilayer film filter which forms the branching element 31-1, a dielectric multilayer film filter similar to that shown in FIG. 3(a) is used, and as the dielectric multilayer film filter which forms the insertion element 31-2, a dielectric multilayer film filter similar to that shown in FIG. 3(b) is used.

Further, since the dielectric multilayer film filters shown in FIGS. 3(a) and 3(b) individually have reversible characteristics, the branching element 31-1 and the insertion element 31-2 of the light branching and insertion apparatus 4C in the present embodiment can be formed from dielectric multilayer filters of a same type.

Since the light branching and insertion apparatus 4C according to the present embodiment is formed from dielectric multilayer film filters in this manner, it can branch signal light of a plurality of wavelengths transmitted by a single optical fiber depending upon the wavelength or insert signal light of a desired wavelength into signal light of a plurality of wavelengths transmitted by a single optical fiber.

Consequently, while optical transmission lines formed from optical fibers overlap with each other in ordinary light branching and insertion apparatus, with the light branching and insertion apparatus according to the present embodiment, optical transmission lines can be formed simply without causing them overlapping with each other.

In the light branching and insertion apparatus 4C according to the present embodiment having the construction described above, when signal light is inputted from the input side optical fiber 32-1, the light branching and insertion apparatus 4C outputs signal light of the desired wavelength from within the inputted signal light to the output side optical fiber 32-2 via the optical fiber 32-3 and the insertion element 31-2, but outputs signal light of the other wavelengths than the desired wavelength from within the inputted signal light to the branching output side optical fiber 32-4.

Further, the light branching and insertion apparatus 4C outputs signal light inputted thereto from the branching input side optical fiber 32-5 to the output side optical fiber 32-2.

Since the light branching and insertion apparatus according to the present embodiment includes the branching element 31-1 and the insertion element 31-2 each formed from a dielectric multilayer film filter in this manner, the light branching and insertion apparatus can effect branching and insertion of signal light upon transmission of signal light with a low loss and with a high degree of accuracy while simplifying the construction of optical transmission lines each formed from optical fiber.

Consequently, where the light branching and insertion apparatus 4C according to the present embodiment is applied to an optical transmission system which effects long haul communication such as, for example, submarine optical communication, the number of optical fiber cables to be laid on the bottom of a sea can be reduced to achieve significant reduction of the cost.

Further, since the light branching and insertion apparatus 4C according to the present embodiment employs a dielectric multilayer film filter which is an optical filter of the passive type, branching and insertion of signal light can be effected without application of any voltage, and the light branching and insertion apparatus 4C operates stably also in an optical transmission system which effects submarine optical communication.

b1. Modification to Second Embodiment

Figure 14:
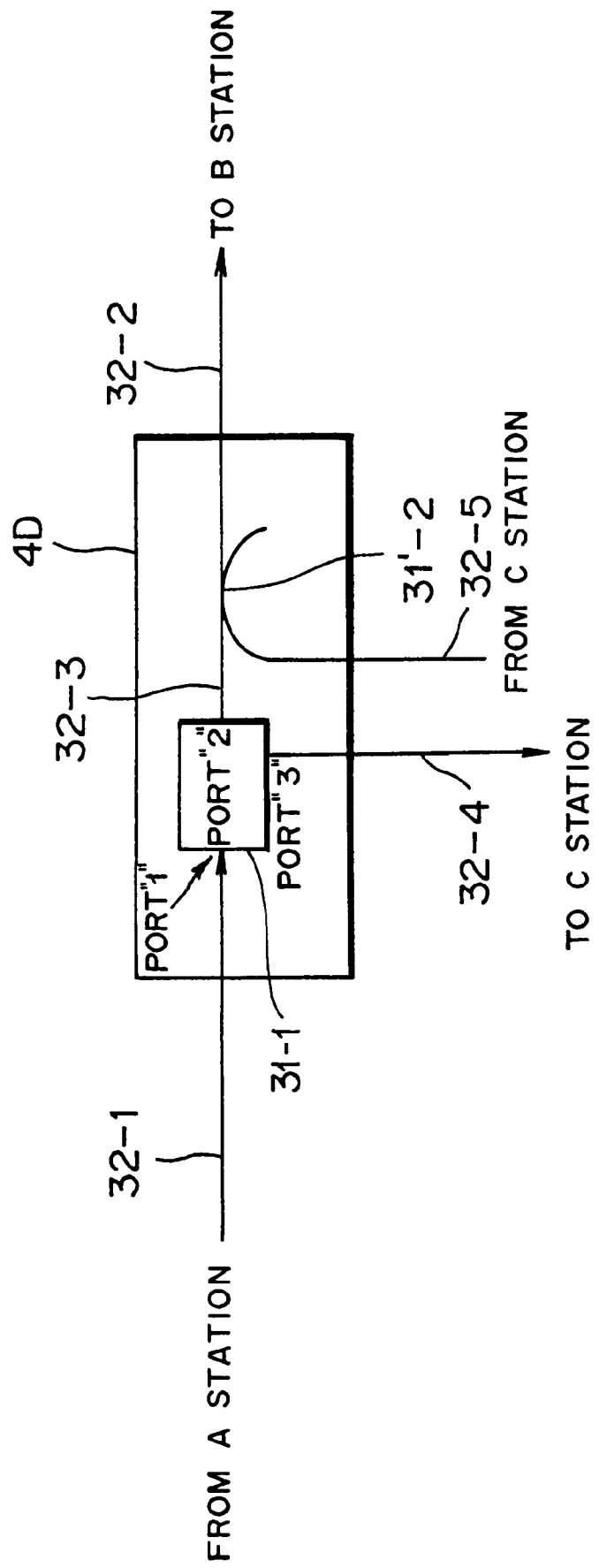
FIG. 14 is a block diagram showing a construction of a modification to the light branching and insertion apparatus of FIG. 12.
Figure 15:
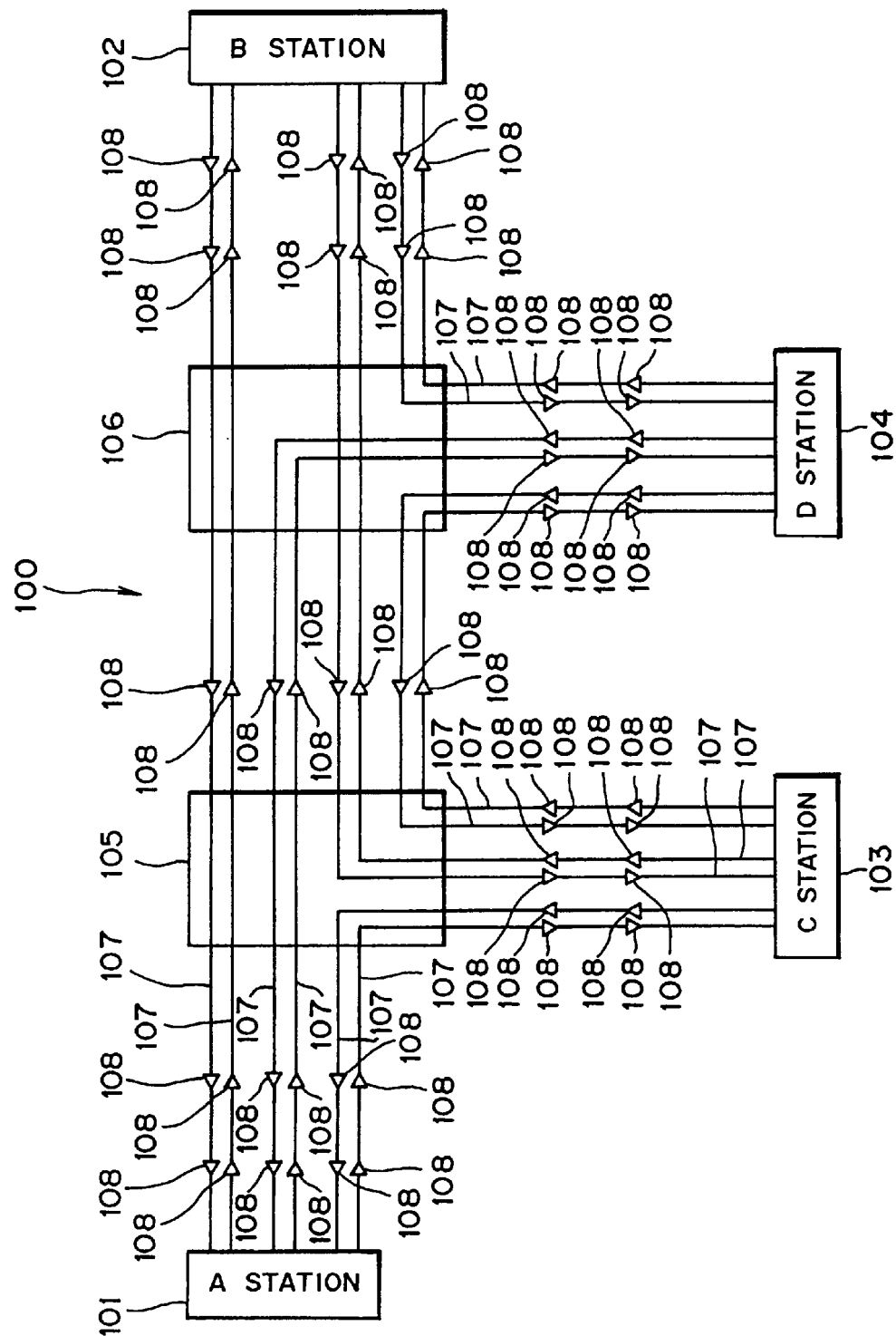
FIG. 15 is a block diagram showing a construction of a typical optical transmission system.

FIG. 14 shows in block diagram a light branching and insertion apparatus according to a modification to the second embodiment of the present invention. Also the light branching and insertion apparatus 4D shown in FIG. 14 is provided, similarly to the light branching and insertion apparatus 4C according to the second embodiment described above, at branching points of optical transmission lines which interconnect a plurality of terminal stations so that signal light may be transmitted between the terminal stations via the optical transmission lines.

Referring to FIG. 14, the light branching and insertion apparatus 4D shown includes a branching element 31-1 and an insertion element 31'-2.

The branching element 31-1 is formed from a dielectric multilayer film filter similarly to the branching element 31-1 in the second embodiment and has similar functions to those of the branching element 31-1 in the second embodiment.

While the insertion element 31'-2 has functions similar to those of the insertion element 31-2 in the second embodiment, different from the insertion element 31-2 in the second embodiment, the insertion element 31'-2 is formed from an optical wave combiner. For the optical wave combiner, for example, an optical coupler of the fusion connection type can be used. It is to be noted that the insertion element 31'-2 is provided in a stage following the branching element 31-1.

Also in the light branching and insertion apparatus 4D according to the modification to the second embodiment having the construction described above, similarly as in the light branching and insertion apparatus 4C according to the second embodiment, if signal light is inputted from the input side optical fiber 32-1, then the light branching and insertion apparatus 4D outputs signal light of a desired wavelength from within the inputted signal light to the output side optical fiber 32-2 via the optical fiber 32-3 and the insertion element 31'-2, but outputs signal light of the other wavelengths than the desired wavelength from within the inputted signal light to the branching output side optical fiber 32-4.

Meanwhile, the light branching and insertion apparatus 4D outputs signal light inputted thereto from the branching input side optical fiber 32-5 to the output side optical fiber 32-2.

Since the light branching and insertion apparatus 4D according to the modification to the second embodiment includes the branching element 31-1 formed from a dielectric multilayer film filter and the insertion element 31'-2 formed from an optical wave combiner in this manner, the light branching and insertion apparatus 4C has similar advantages to those of the light branching and insertion apparatus 4C according to the second embodiment.

Further, since the insertion element 31'-2 of the light branching and insertion apparatus 4D according to the modification to the second embodiment is formed from an optical wave combiner, although the light branching and insertion apparatus 4D exhibits a loss of signal light a little higher than that of the light branching and insertion apparatus 4C according to the second embodiment, the light branching and insertion apparatus 4D is simplified in construction comparing with the light branching and insertion apparatus 4C.

c. Others

While it is described above that an optical coupler of the fusion connection type is used for the optical wave combiners which form the first to third insertion elements 11'-2 to 13'-2 of the light branching and insertion apparatus 4A according to the first modification to the first embodiment or the insertion element 31'-2 of the light branching and insertion apparatus 4D according to the second embodiment, the optical wave combiners need not be formed from optical couplers of the fusion connection type, and optical couplers of the bulk type which have no polarization dependency can be used alternatively. Also in this instance, the light branching and insertion apparatus 4A or the light branching and insertion apparatus 4D can be formed in a simplified construction.

The present invention is not limited to the specifically described embodiment, and variations and modifications may be made without departing from the scope of the present invention.

What is claimed is:

1. A light branching and insertion apparatus, comprising:
   a first branching element having an input and first and second outputs, for outputting signal light of a first wavelength among signal light of different wavelengths inputted from the input to the first output and outputting signal light of the other wavelengths from the input to the second output;

a first insertion element having an output and first and second inputs, the first input being connected to the first output of the first branching element, for outputting signal light inputted from the first and second inputs thereof to the output thereof;

a second branching element having an input and first and second outputs, for outputting signal light of a second wavelength among signal light of different wavelengths inputted from the input to the first output and outputting signal light of the other wavelengths to the second output thereof;

a second insertion element having an output and first and second inputs, the first input thereof being connected to the first output of the second branching element, for outputting signal light inputted from the first and second inputs to the output thereof;

a third branching element having input and first and second outputs, the first output thereof being connected to the second input of the second insertion element, the second output thereof being connected to the second input of the second insertion element, for outputting signal light of a third wavelength among signal light of different wavelengths inputted at the input thereof to the first output and outputting signal light of the other wavelengths to the second output; and a third insertion element having an output and first and second inputs, the first input being connected to the second output of the first branching element and the second input being connected to the second output of the second branching element, for outputting signal light from the first and second inputs to the output thereof.

2. A light branching and insertion apparatus as claimed in claim 1, wherein the signal light of the first wavelength from within the signal light inputted from said ascending input side optical fiber is outputted to said ascending output side optical fiber via said first branching element and said first insertion element and the signal light of the other wavelengths than the first wavelength from within the signal light inputted from said ascending input side optical fiber is outputted to said branching output side optical fiber via said first branching element and said third insertion element; the signal light of the third wavelength from within the signal light inputted from said branching input side optical fiber is outputted to said ascending output side optical fiber via said third branching element and said first insertion element; the signal light of the second wavelength from within the signal light inputted from said descending input side optical fiber is outputted to said descending output side optical fiber via said second branching element and said second insertion element and the signal light of the other wavelengths than the second wavelength from within the signal light inputted from said descending input side optical fiber is outputted to said branching output side optical fiber via said second branching element and said third insertion element; and the signal light of the other wavelengths than the third wavelength from within the signal light inputted from said branching input side optical fiber is outputted to said descending output side optical fiber via said third branching element and said second insertion element.

3. A light branching and insertion apparatus as claimed in claim 1, wherein said first branching element is in the form of a dielectric multilayer film filter which functions, for the signal light of the first wavelength among the signal light of the different wavelenghts inputted from the input thereof, as a band-pass filter which allows passage of the signal light of the first wavelength to the first output, and for the signal light of the other wavelengths than the first wavelength among the signal light inputted from the input, as a band block filter which outputs the signal light of said other wavelengths to the second output, said first insertion element is in the form of another dielectric multilayer film filter which functions as an optical coupler which outputs the signal light inputted from the second input to the output thereof;

said second branching element is in the form of a further dielectric multilayer film filter which functions, for the signal light of the second wavelength among the signal light of the different wavelengths inputted from the input thereof, a band-pass filter which allows passage of the signal light of the second wavelength to the first output thereof, and for the signal light of the other wavelengths than the second wavelength among the signal light inputted from the input thereof, as a band block filter which outputs the signal light of said other wavelengths to the second output, said second insertion element is in the form of a still further dielectric multilayer film filter which functions as an optical coupler which outputs the signal light inputted from the second input thereof to the output thereof, said third branching element is in the form of an additional dielectric multilayer film filter which functions, for the signal light of the third wavelength among the signal light of the different wavelengths inputted from the input thereof, as a band-pass filter which allows passage of the signal light of the third wavelength to the first output thereof, and for the signal light of the other wavelengths than the third wavelength among the signal light inputted from the input thereof, as a band block filter which outputs the signal light of the other wavelengths to the second output, and said third insertion element is in the form of a still further dielectric multilayer film filter which functions as an optical coupler which outputs the signal light inputted from the first and second inputs thereof to the output thereof.

4. A light branching and insertion apparatus as claimed in claim 1, wherein said first branching element is in the form of a dielectric multilayer film filter which functions, for the signal light of the first wavelength among the signal light of the different wavelengths inputted from the input thereof, as a band-pass filter which allows passage of the signal light of the first wavelength to the first output, and for the signal light of the other wavelengths than the first wavelength among the signal light inputted from the input, as a band block filter which outputs the signal light of said other wavelengths to the second output, said first insertion element is in the form of an optical wave combiner which functions as an optical coupler which outputs the signal light inputted from the second input thereof to the output;

said second branching element is in the form of a further dielectric multilayer film filter which functions, for the signal light of the second wavelength among the signal light of the different wavelengths inputted from the input thereof, a band-pass filter which allows passage of the signal light of the second wavelength to the first output thereof, and for the signal light of the other wavelengths than the second wavelength among the signal light inputted from the input thereof, as a band block filter which outputs the signal light of said other wavelengths to the second output, said second insertion element is in the form of another optical wave combiner which functions as an optical coupler which outputs the signal light inputted from said second input thereof to said output thereof;

said third branching element is in the form of an additional dielectric multilayer film filter which functions, for the signal light of the third wavelength among the signal light of the different wavelengths inputted from the input thereof, as a band-pass filter which allows passage of the signal light of the third wavelength to the first output thereof, and for the signal light of the other wavelengths than the third wavelength among the signal light inputted from the input thereof, as a band block filter which outputs the signal light of the other wavelengths to the second output, and said third insertion element is in the form of a further optical wave combiner which functions as an optical coupler which outputs the signal light inputted from first and second inputs thereof to the output thereof.

5. A light branching and insertion apparatus as claimed in claim 1, wherein each of said first branching element and said first insertion element is in the form of a grating filter.

6. A light branching and insertion apparatus as claimed in claim 1, wherein each of said second branching element and said second insertion element is in the form of a grating filter.

7. A light branching and insertion apparatus as claimed in claim 5, wherein said grating filter is a fiber grating filter.

8. A light branching and insertion apparatus as claimed in claim 5, wherein said grating filter is a waveguide type grating filter.

9. A light branching and insertion apparatus as claimed in claim 6, wherein said grating filter is a fiber grating filter.

10. A light branching and insertion apparatus as claimed in claim 6, wherein said grating filter is a waveguide type grating filter.

11. A light branching and insertion apparatus, comprising:

a branching element having an input and first and second outputs for outputting signal light of a first wavelength among signal light of different wavelengths inputted from the input thereof to the first output and outputting signal light of the other wavelengths from the input thereof to the second output; and an insertion element having an output and first and second inputs, there first input thereof being connected to the first output of the branching element, for outputting signal light inputted from the first and second inputs to the output thereof;

said branching element being in the form of a dielectric multilayer film filter which functions, for the signal light of the first wavelength among the signal light of the different wavelengths inputted from the input thereof, as a band-pass filter which allows passage of the signal light of the first wavelength to the first output, and for the signal light of the other wavelengths than the first wavelength among the signal light inputted from the input thereof, as a band block filter which allows passage of the signal light of said other wavelengths to the second output;

said insertion element being in the form of another dielectric multilayer film filter of the same type as that of said branching element which functions as an optical coupler and outputs the signal light inputted from the first and second inputs to the output thereof.

12. A light branching and insertion apparatus, comprising:

a branching element having an input and first and second outputs for outputting signal light of a first wavelength among signal light of different wavelengths inputted from the input thereof to the first output and outputting signal light of the other wavelengths from the input thereof to the second output; and an insertion element having an output and first and second inputs, there first input thereof being connected to the first output of the branching element, for outputting signal light inputted from the first and second inputs to the output thereof;

said branching element being in the form of a dielectric multilayer film filter which functions, for the signal light of the first wavelength among the signal light of the different wavelengths inputted from the input thereof, as a band-pass filter which allows passage of the signal light of the first wavelength to the first output, and for the signal light of the other wavelengths than the first wavelength among the signal light inputted from the input thereof, as a band block filter which allows passage of the signal light of said other wavelengths to the second output;

said insertion element being in the form of an optical wave combiner which functions as an optical coupler and outputs the signal light inputted from the first and second inputs thereof to the output thereof.

13. An optical transmission system, comprising:

a plurality of terminal stations;

a plurality of optical transmission lines each in the form of an optical fiber for connecting said terminal stations to each other; and a light branching and insertion apparatus provided at each branching point of said optical transmission lines for allowing communication of signal light between said terminal stations via said optical transmission lines, said light branching and insertion apparatus including:

(a) a first branching element having an input and first and second outputs, the input thereof being connected to an ascending input side optical fiber, which forms one of said optical transmission lines, for outputting signal light of a first wavelength among signal light of different wavelengths inputted from said ascending input side optical fiber to said first output and outputting signal light of the other wavelengths from said ascending input side optical fiber to said second output, (b) in a first insertion element having an output and first and second inputs, the first input thereof being connected to the first output of the first branching element, the output of the first insertion element being connected to an ascending out side optical fiber for outputting signal light inputted from said first and second inputs to said ascending output side optical fiber, (c) a second branching element having an input and first and second outputs, the input thereof being connected to a descending input optical fiber, which forms one of said optical transmission lines, for outputting signal light of a second wavelength among signal light of different wavelengths inputted from said descending input side optical fiber to said first output thereof and outputting signal light of the other wavelengths than the second wavelength from among the signal light inputted thereto from said descending input side optical fiber to said second output thereof, (d) a second insertion element having an output and first and second inputs, the first input thereof being connected to the first output of the second branching element, the output thereof being connected to a descending output side optical fiber for outputting signal light inputted from the first and second inputs to said descending output side optical fiber, (e) a third branching element having an input and first and second outputs, the first output thereof being connected to the second input of the first insertion element, the second output of the third branching element being connected to the second input of the second insertion element, the input of the third branching element being connected to a branching input side optical fiber, for outputting signal light of a third wavelength among signal light of different wavelengths inputted from said branching input side optical fiber to said first output and outputting signal light of the other wavelengths to said second output, and (f) a third insertion element having an output and first and second inputs, the first input thereof being connected to the second output of the first branching element, the second input of the third insertion element being connected to the second output of the second branching element, the output of the third insertion element being connected to a branching output side optical fiber for outputting signal light inputted thereto from said first and second inputs to said branching output side optical fiber.

14. An optical transmission system, comprising:

a plurality of terminal stations;

a plurality of optical transmission lines each in the form of an optical fiber for connecting said terminal stations to each other; and a light branching and insertion apparatus provided at each branching point of said optical transmission lines for allowing communication of signal light between said terminal stations via said optical transmission lines, said light branching and insertion apparatus including:

a branching element having an input and first and second outputs, the input thereof being connected to an input side optical fiber, which forms one of said optical transmission lines, the second output of the light branching element being connected to a branching output side optical fiber, which forms one of said optical transmission lines, for outputting signal light of a first wavelength among signal light of different wavelengths inputted from said input side optical fiber to said first output and outputting signal light of the other wavelengths from said input side optical fiber to the branching output side optical fiber, and an insertion element having an output and first and second inputs, the first input thereof being connected to the first output of the branching element, the second output of the insertion element being connected to a branching input side optical fiber, which forms one of said optical transmission lines, the output of the insertion element connected to an output side optical fiber, which forms one said optical transmission, for outputting signal light inputted from said first and second inputs to said output side optical fiber, said branching element being in the form of a dielectric multilayer film filter which functions, for the signal light of the first wavelength among the signal light of the different wavelengths inputted from said input side optical fiber, as a band-pass filter which outputs the signal light of the first wavelength to said first output, and for the signal light of the other wavelengths than the first wavelength among the signal light inputted from said input side optical fiber, as a band block filter which outputs the signal light of the other wavelengths to said branching output side optical fiber, said insertion element being in the form of another dielectric multilayer film filter of the same type as that of said branching element which functions as an optical coupler which outputs the signal light inputted from said first and second inputs to said output side optical fiber.

15. An optical transmission system, comprising:

a plurality of terminal stations;

a plurality of optical transmission lines each in the form of an optical fiber for connecting said terminal stations to each other; and a light branching and insertion apparatus provided at each branching point of said optical transmission lines for allowing communication of signal light between said terminal stations via said optical transmission lines, said light branching and insertion apparatus including:

a branching element having an input and first and second outputs, the input thereof being connected to an input side optical fiber, which forms one of said optical transmission lines, the second output of the light branching element being connected to a branching output side optical fiber, which forms one of said optical transmission lines, for outputting signal light of a first wavelength among signal light of different wavelengths inputted from said input side optical fiber to said first output and outputting signal light of the other wavelengths from said input side optical fiber to the branching output side optical fiber, and an insertion element having an output and first and second inputs, the first input thereof being connected to the first output of the branching element, the second input of the insertion element being corrected to a branching input side optical fiber, which forms one of said optical transmission lines, the output of the insertion element being connected to an output side optical fiber, which forms one said optical transmission, for outputting signal light inputted from said first and second inputs to said output side optical fiber, said branching element being in the form of a dielectric multilayer film filter which functions, for the signal light of the first wavelength among the signal light of the different wavelengths inputted from said input side optical fiber, as a band-pass filter which outputs the signal light of the first wavelength to said first output, and for the signal light of the other wavelengths than the first wavelength among the signal light inputted from said input side optical fiber, as a band block filter which outputs the signal light of the other wavelengths to said branching output side optical fiber, said insertion element being in the form of an optical wave combiner which functions as an optical coupler and outputs the signal light inputted from said branching input side optical fiber to said output side optical fiber.

\* \* \* \* \*